US012220765B2

(12) United States Patent
Okuhira et al.

(10) Patent No.: US 12,220,765 B2
(45) Date of Patent: Feb. 11, 2025

(54) BUTT WELDED JOINT OF STEEL MATERIAL AND METHOD FOR MANUFACTURING SAME

(71) Applicant: SMC CORPORATION, Chiyoda-ku (JP)

(72) Inventors: Hiroyuki Okuhira, Moriya (JP); Rikiya Ishikawa, Itabashi-ku (JP); Takuya Tadano, Taito-ku (JP)

(73) Assignee: SMC CORPORATION, Chiyoda-ku (JP)

( * ) Notice: Subject to any disclaimer, the term of this patent is extended or adjusted under 35 U.S.C. 154(b) by 830 days.

(21) Appl. No.: 17/252,915

(22) PCT Filed: Jun. 6, 2019

(86) PCT No.: PCT/JP2019/022446
§ 371 (c)(1),
(2) Date: Dec. 16, 2020

(87) PCT Pub. No.: WO2020/003950
PCT Pub. Date: Jan. 2, 2020

(65) Prior Publication Data
US 2021/0260699 A1    Aug. 26, 2021

(30) Foreign Application Priority Data

Jun. 27, 2018    (JP) .................................. 2018-122414

(51) Int. Cl.
*B23K 26/282* (2014.01)
*B23K 26/32* (2014.01)
(Continued)

(52) U.S. Cl.
CPC ............ *B23K 26/282* (2015.10); *B23K 26/32* (2013.01); *B23K 2101/04* (2018.08);
(Continued)

(58) Field of Classification Search
CPC .. B23K 26/282; B23K 26/32; B23K 2103/04; B23K 2101/04; C22C 38/02; C22C 38/04; C22C 38/44
(Continued)

(56) References Cited

U.S. PATENT DOCUMENTS 4,023,005 A * 5/1977 Bolin ..................... B23K 26/18
219/121.64
4,459,062 A * 7/1984 Siebert ..................... B23K 9/23
219/76.16
(Continued)

FOREIGN PATENT DOCUMENTS

| CN | 102596481 A | 7/2012 |
|---|---|---|
| CN | 102639278 A | 8/2012 |

(Continued)

OTHER PUBLICATIONS

International Search Report issued on Sep. 3, 2019 in PCT/JP2019/022446 filed on Jun. 6, 2019, 1 page.
(Continued)

*Primary Examiner* — Jimmy Chou
(74) *Attorney, Agent, or Firm* — Oblon, McClelland, Maier & Neustadt, L.L.P.

(57) ABSTRACT

Base materials of a butt welded joint with a welded portion have a carbon concentration of 0.1 mass % or greater and 0.35 mass % of less. The welded portion is formed by heating by keyhole welding and then reheating by heat conduction welding, and the welded portion has a melted and solidified portion by the keyhole welding, a reheated solidified portion by the heat conduction welding, and a remelted and solidified portion. A width W0 and a depth d0 of the melted and solidified portion and a width W1 and a
(Continued)

depth d1 of the remelted and solidified portion have the following relationships: $0.46W0 \leq W1$; and $0.14d0 \leq d1 \leq 0.73d0$.

8 Claims, 15 Drawing Sheets

(51) Int. Cl.
  *B23K 101/04* (2006.01)
  *B23K 103/04* (2006.01)
  *C22C 38/02* (2006.01)
  *C22C 38/04* (2006.01)
  *C22C 38/44* (2006.01)

(52) U.S. Cl.
  CPC .......... *B23K 2103/04* (2018.08); *C22C 38/02* (2013.01); *C22C 38/04* (2013.01); *C22C 38/44* (2013.01)

(58) Field of Classification Search
  USPC .................................................... 219/121.63
  See application file for complete search history.

(56) References Cited

U.S. PATENT DOCUMENTS

| | | | | | |
|---|---|---|---|---|---|
| 4,691,093 | A | * | 9/1987 | Banas | B23K 15/004 |
| | | | | | 219/121.64 |
| 5,148,966 | A | * | 9/1992 | Minase | B23K 31/02 |
| | | | | | 228/175 |
| 6,336,583 | B1 | * | 1/2002 | Wang | B23K 31/02 |
| | | | | | 228/175 |
| 7,154,064 | B2 | * | 12/2006 | Wang | B23K 26/32 |
| | | | | | 219/121.64 |
| 7,470,487 | B2 | * | 12/2008 | Tomimoto | H01M 50/56 |
| | | | | | 219/121.64 |
| 7,479,616 | B2 | * | 1/2009 | Wang | B23K 33/00 |
| | | | | | 219/121.81 |
| 8,350,185 | B2 | * | 1/2013 | Lee | B23K 26/244 |
| | | | | | 219/121.64 |
| 8,653,403 | B2 | * | 2/2014 | Honma | B23K 15/0006 |
| | | | | | 219/121.14 |
| 8,992,109 | B2 | * | 3/2015 | Ishikawa | C21D 1/09 |
| | | | | | 403/270 |
| 10,807,138 | B2 | * | 10/2020 | Miyazaki | C22C 38/38 |
| 11,198,195 | B2 | * | 12/2021 | Evangelista | B23K 26/322 |
| 11,364,569 | B2 | * | 6/2022 | Egawa | B23K 26/0093 |
| 2004/0045323 | A1 | * | 3/2004 | Schultz | C03B 23/20 |
| | | | | | 65/153 |
| 2004/0099642 | A1 | * | 5/2004 | Sonoda | B23K 26/244 |
| | | | | | 219/121.64 |
| 2005/0023258 | A1 | * | 2/2005 | Tsushima | B23K 35/3611 |
| | | | | | 219/121.64 |
| 2005/0121426 | A1 | * | 6/2005 | Wang | B23K 26/244 |
| | | | | | 219/121.64 |
| 2009/0236321 | A1 | * | 9/2009 | Hayashi | H01R 4/029 |
| | | | | | 219/121.64 |
| 2010/0183112 | A1 | * | 7/2010 | Ashida | B23K 33/006 |
| | | | | | 219/76.1 |
| 2010/0243621 | A1 | * | 9/2010 | Nowak | B23K 26/26 |
| | | | | | 219/121.64 |
| 2011/0042361 | A1 | * | 2/2011 | Nowak | B23K 26/0604 |
| | | | | | 219/121.64 |
| 2011/0248071 | A1 | * | 10/2011 | Kiuchi | C22C 38/004 |
| | | | | | 228/119 |
| 2012/0129006 | A1 | * | 5/2012 | Kanai | B23K 11/312 |
| | | | | | 428/683 |
| 2012/0160376 | A1 | * | 6/2012 | Yamada | C22C 38/001 |
| | | | | | 148/330 |
| 2012/0237287 | A1 | * | 9/2012 | Honma | B23K 15/0006 |
| | | | | | 219/121.14 |
| 2012/0288324 | A1 | * | 11/2012 | Ishikawa | B23K 15/06 |
| | | | | | 219/121.14 |
| 2012/0298628 | A1 | * | 11/2012 | Bowers | B23K 9/1735 |
| | | | | | 228/19 |
| 2012/0298638 | A1 | * | 11/2012 | Beck | B23K 26/26 |
| | | | | | 219/121.64 |
| 2013/0136940 | A1 | * | 5/2013 | Lin | B23K 26/348 |
| | | | | | 219/121.64 |
| 2014/0008332 | A1 | * | 1/2014 | Ogborn | B23K 26/211 |
| | | | | | 219/121.84 |
| 2014/0042208 | A1 | * | 2/2014 | Uchida | B23K 26/32 |
| | | | | | 228/103 |
| 2014/0061171 | A1 | * | 3/2014 | Lin | B23K 26/14 |
| | | | | | 219/121.64 |
| 2014/0126167 | A1 | * | 5/2014 | Bozorgi | H05K 1/18 |
| | | | | | 219/121.64 |
| 2014/0377586 | A1 | * | 12/2014 | Van De Sanden | B23K 35/3033 |
| | | | | | 384/445 |
| 2015/0266132 | A1 | * | 9/2015 | Kawakita | B23K 26/24 |
| | | | | | 219/121.64 |
| 2015/0283648 | A1 | * | 10/2015 | Hisada | B23K 26/22 |
| | | | | | 219/121.64 |
| 2015/0298255 | A1 | * | 10/2015 | Hisada | B23K 26/32 |
| | | | | | 219/121.64 |
| 2016/0052091 | A1 | * | 2/2016 | Uchida | B23K 26/21 |
| | | | | | 219/121.64 |
| 2016/0067832 | A1 | * | 3/2016 | Kobayashi | B23K 26/032 |
| | | | | | 219/121.64 |
| 2016/0271730 | A1 | * | 9/2016 | Gu | B23K 26/322 |
| 2016/0375522 | A1 | * | 12/2016 | Bruck | B23P 6/005 |
| | | | | | 219/121.64 |
| 2017/0120369 | A1 | * | 5/2017 | Nakagawa | G01N 29/28 |
| 2017/0297151 | A1 | * | 10/2017 | Kodama | B23K 37/06 |

FOREIGN PATENT DOCUMENTS

| | | |
|---|---|---|
| CN | 105458507 A | 4/2016 |
| CN | 106001863 A | 10/2016 |
| CN | 107107228 A | 8/2017 |
| DE | 10 2014 203 025 A1 | 8/2015 |
| JP | 57-106489 A | 7/1982 |
| JP | 59-110490 A | 6/1984 |
| JP | 1-205892 A | 8/1989 |
| JP | 2002-256335 A | 9/2002 |
| JP | 2010-149160 A | 7/2010 |
| JP | 2017-52005 A | 3/2017 |
| JP | 2017-52006 A | 3/2017 |
| JP | 2017052006 A * | 3/2017 |

OTHER PUBLICATIONS

Combined Office Action and Search Report issued Jul. 4, 2022 in Chinese Patent Application No. 201980043078.2 (with unedited computer generated English translation of Office Action only), 14 pages.

Extended European Search Report issued Mar. 7, 2022 in European Patent Application No. 19824610.0, 6 pages.

* cited by examiner (a)

(b)

① MELTED AND SOLIDIFIED PORTION 461Hv

① REMELTED AND SOLIDIFIED PORTION 460Hv
② REHEATED SOLIDIFIED PORTION 387Hv

CONDITION 5

|     | 0   | 0.1 | 0.2 | 0.3 | 0.4 | 0.5 | 0.6 | 0.7 | 0.8 | 0.9 | 1 |
|-----|-----|-----|-----|-----|-----|-----|-----|-----|-----|-----|---|
| 0.1 | 444 | 485 | 485 | 471 | 333 | 257 | 212 | 227 | 218 | 225 |   |
| 0.2 | 447 |     | 485 |     |     |     |     |     |     |     |   |
| 0.3 | 455 | 485 | 471 | 471 | 333 | 257 | 212 | 227 | 218 |     |   |
| 0.4 | 305 |     | 308 |     |     |     |     |     |     |     |   |
| 0.5 | 374 |     | 377 |     |     |     |     |     |     |     |   |
| 0.6 | 386 |     | 389 |     |     |     |     |     |     |     |   |
| 0.7 | 396 |     | 399 |     |     |     |     |     |     |     |   |
| 0.8 | 387 |     | 390 |     |     |     |     |     |     |     |   |
| 0.9 | 392 |     | 395 |     |     |     |     |     |     |     |   |
| 1   |     |     |     |     |     |     |     |     |     |     |   |

① REMELTED AND SOLIDIFIED PORTION
WIDTH : 0.82mm
DEPTH : 0.15mm

~Hv300
Hv301~350
Hv351~400
Hv401~450
Hv451~

① REMELTED AND SOLIDIFIED PORTION 470Hv
② REHEATED SOLIDIFIED PORTION 395Hv

CONDITION 6

|     | 0   | 0.1 | 0.2 | 0.3 | 0.4 | 0.5 | 0.6 | 0.7 | 0.8 | 0.9 | 1 |
|-----|-----|-----|-----|-----|-----|-----|-----|-----|-----|-----|---|
| 0.1 | 473 | 473 | 473 | 483 | 352 | 323 | 260 | 249 | 226 | 225 |   |
| 0.2 | 468 |     | 447 |     |     |     |     |     |     |     |   |
| 0.3 | 469 | 341 | 388 | 336 | 341 | 404 | 245 | 245 | 226 |     |   |
| 0.4 | 420 |     | 465 |     |     |     |     |     |     |     |   |
| 0.5 | 394 |     | 412 |     |     |     |     |     |     |     |   |
| 0.6 | 388 |     | 408 |     |     |     |     |     |     |     |   |
| 0.7 | 387 |     | 420 |     |     |     |     |     |     |     |   |
| 0.8 | 405 |     | 410 |     |     |     |     |     |     |     |   |
| 0.9 | 400 |     | 405 |     |     |     |     |     |     |     |   |
| 1   |     |     |     |     |     |     |     |     |     |     |   |

② REMELTED AND SOLIDIFIED PORTION
WIDTH : 0.46mm
DEPTH : 0.14mm

~Hv300
Hv301~350
Hv351~400
Hv401~450
Hv451~

① REMELTED AND SOLIDIFIED PORTION 469Hv
② REHEATED SOLIDIFIED PORTION 399Hv

CONDITON 7

| | 0 | 0.1 | 0.2 | 0.3 | 0.4 | 0.5 | 0.6 | 0.7 | 0.8 | 0.9 | 1 |
|---|---|---|---|---|---|---|---|---|---|---|---|
| 0.1 | 457 | 458 | 446 | 450 | 458 | 312 | 269 | 243 | 222 | 227 | 213 |
| 0.2 | 492 | | 485 | | | ① | | | | | |
| 0.3 | 509 | 507 | 485 | 457 | 485 | 308 | 252 | 228 | 242 | 220 | 228 |
| 0.4 | 503 | | 446 | | | | | | | | |
| 0.5 | 478 | | 470 | | | | | | | | |
| 0.6 | 460 | | 460 | | | | | | | | |
| 0.7 | 438 | | 447 | | | | | | | | |
| 0.8 | 468 | | 306 | | | | | | | | |
| 0.9 | 375 | | 299 | | ② | | | | | | |
| 1 | | | | | | | | | | | |

REMELTED AND SOLIDIFIED PORTION
WIDTH : 0.75mm
DEPTH : 0.73mm

~Hv300
Hv301~350
Hv351~400
Hv401~450
Hv451~

①REMELTED AND SOLIDIFIED PORTION 469Hv
②REHEATED SOLIDIFIED PORTION 362Hv

CONDITION 8

| | 0 | 0.1 | 0.2 | 0.3 | 0.4 | 0.5 | 0.6 | 0.7 | 0.8 | 0.9 | 1 |
|---|---|---|---|---|---|---|---|---|---|---|---|
| 0.1 | 524 | 540 | 432 | 435 | 498 | 438 | 432 | 245 | 230 | 239 | 248 |
| 0.2 | 450 | | 473 | ① | | | | | | | |
| 0.3 | 476 | 435 | 460 | 513 | 463 | 476 | 412 | 280 | 271 | 269 | 238 |
| 0.4 | 441 | | 476 | | | | | | | | |
| 0.5 | 466 | | 444 | ② | | | | | | | |
| 0.6 | 470 | | 457 | | | | | | | | |
| 0.7 | 463 | | 460 | | | | | | | | |
| 0.8 | 476 | | 498 | | | | | | | | |
| 0.9 | 498 | | 494 | | | | | | | | |
| 1 | | | | | | | | | | | |

REMELTED AND SOLIDIFIED PORTION
WIDTH : 0.35mm
DEPTH : 0.08mm

~Hv300
Hv301~350
Hv351~400
Hv401~450
Hv451~

①REMELTED AND SOLIDIFIED PORTION 498Hv
②REHEATED SOLIDIFIED PORTION 458Hv

CONDITION 9

|  | 0 | 0.1 | 0.2 | 0.3 | 0.4 | 0.5 | 0.6 | 0.7 | 0.8 | 0.9 | 1 |
|---|---|---|---|---|---|---|---|---|---|---|---|
| 0.1 | 415 | 399 | 388 | 396 | 399 | 182 | 166 | 148 | 157 | 156 | |
| 0.2 | 399 |  | 390 | 399 | | | | | | | |
| 0.3 | 401 | 394 | 396 | 367 | 207 | 198 | 173 | 149 | 153 | 156 | |
| 0.4 | 404 |  | 340 | 308 | | | | | | | |
| 0.5 | 407 |  | 328 | 330 | ①| | | | | | |
| 0.6 | 396 |  | 330 | 299 | | | | | | | |
| 0.7 | 391 |  | 325 | 268 | | | | | | | |
| 0.8 | 391 |  | 336 | 170 | | | | | | | |
| 0.9 | 381 |  | 305 | 196 | | | | | | | |
| 1 | 395 |  | 327 | 176 | | | | | | | |

- ~Hv300
- Hv301~350
- Hv351~400
- Hv401~450
- Hv451~

① MELTED AND SOLIDIFIED PORTION 379Hv

CONDITON 10

|  | 0 | 0.1 | 0.2 | 0.3 | 0.4 | 0.5 | 0.6 | 0.7 | 0.8 | 0.9 | 1 |
|---|---|---|---|---|---|---|---|---|---|---|---|
| 0.1 | 386 | 405 | 396 | 393 | 360 | 351 | 167 | 186 | 158 | 157 | |
| 0.2 | 406 | | | 423 | ① | | | | | | |
| 0.3 | 399 | 385 | 401 | 418 | 213 | 207 | 169 | 167 | 158 | 155 | |
| 0.4 | 374 | | 395 | 423 | | | | | | | |
| 0.5 | 334 | | 325 | 200 | ② | | | | | | |
| 0.6 | 332 | | 310 | 226 | | | | | | | |
| 0.7 | 321 | | 330 | 205 | | | | | | | |
| 0.8 | 323 | | 320 | 197 | | | | | | | |
| 0.9 | 345 | | 310 | 199 | | | | | | | |
| 1 | 325 | | 315 | 176 | | | | | | | |

REMELTED AND SOLIDIFIED PORTION
WIDTH : 1.05mm
DEPTH : 0.23mm

- ~Hv300
- Hv301~350
- Hv351~400
- Hv401~450
- Hv451~

① REMELTED AND SOLIDIFIED PORTION 393Hv
② REHEATED SOLIDIFIED PORTION 353Hv

CONDITION 11

|     | 0   | 0.1 | 0.2 | 0.3 | 0.4 | 0.5 | 0.6 | 0.7 | 0.8 | 0.9 | 1   |
|-----|-----|-----|-----|-----|-----|-----|-----|-----|-----|-----|-----|
| 0.1 | 457 | 460 | 460 | 444 | 444 | 379 | 271 | 208 | 196 | 175 | 163 |
| 0.2 | 432 |     | 470 | 473 |     |     |     |     |     |     |     |
| 0.3 | 450 | 435 | 516 | 483 | 483 | 369 | 245 | 200 | 178 | 175 | 185 |
| 0.4 | 444 |     | 521 | 501 |     |     |     |     |     |     |     |
| 0.5 | 444 |     | 553 | 603 |     |     |     |     |     |     |     |
| 0.6 | 494 |     | 458 | 463 |     | ①   |     |     |     |     |     |
| 0.7 | 460 |     | 451 | 415 |     |     |     |     |     |     |     |
| 0.8 | 457 |     | 428 | 358 |     |     |     |     |     |     |     |
| 0.9 | 453 |     | 410 | 420 |     |     |     |     |     |     |     |
| 1   | 450 |     | 426 |     |     |     |     |     |     |     |     |

- ~Hv300
- Hv301~350
- Hv351~400
- Hv401~450
- Hv451~

① MELTED AND SOLIDIFIED PORTION 460Hv

CONDITION 12

|     | 0   | 0.1 | 0.2 | 0.3 | 0.4 | 0.5 | 0.6 | 0.7 | 0.8 | 0.9 | 1   |
|-----|-----|-----|-----|-----|-----|-----|-----|-----|-----|-----|-----|
| 0.1 | 457 | 435 | 494 | 435 | 473 | 450 | 598 | 286 | 206 | 189 | 172 |
| 0.2 | 453 |     | 459 | 420 |     | ①   |     |     |     |     |     |
| 0.3 | 444 | 473 | 457 | 470 | 483 | 409 | 241 | 217 | 186 | 181 | 185 |
| 0.4 | 487 |     | 430 | 444 |     |     |     |     |     |     |     |
| 0.5 | 438 |     | 428 | 447 |     | ②   |     |     |     |     |     |
| 0.6 | 280 |     | 295 | 289 |     |     |     |     |     |     |     |
| 0.7 | 289 |     | 288 | 293 |     |     |     |     |     |     |     |
| 0.8 | 306 |     | 284 | 294 |     |     |     |     |     |     |     |
| 0.9 | 294 |     | 265 | 289 |     |     |     |     |     |     |     |
| 1   | 306 |     | 276 |     |     |     |     |     |     |     |     |

REMELTED AND SOLIDIFIED PORTION
WIDTH : 1.05mm
DEPTH : 0.23mm

- ~Hv300
- Hv301~350
- Hv351~400
- Hv401~450
- Hv451~

① REMELTED AND SOLIDIFIED PORTION 455Hv
② REHEATED SOLIDIFIED PORTION 360Hv

CONDITION 13

|     | 0   | 0.1 | 0.2 | 0.3 | 0.4 | 0.5 | 0.6 | 0.7 | 0.8 | 0.9 | 1 |
|-----|-----|-----|-----|-----|-----|-----|-----|-----|-----|-----|---|
| 0.1 | 466 | 444 | 494 | 476 | 524 | 313 | 269 | 257 | 221 | 244 |   |
| 0.2 | 476 |     |     | 509 |     |     |     |     |     |     |   |
| 0.3 | 494 | 494 | 470 | 470 | 450 | 426 | 248 | 239 | 256 | 262 |   |
| 0.4 | 453 |     | 450 | 432 |     |     |     |     |     |     |   |
| 0.5 | 505 |     | 455 | 364 |     |     |     |     |     |     |   |
| 0.6 | 476 |     | 456 | 353 |     |     |     |     |     |     |   |
| 0.7 | 463 |     | 430 | 338 |     |     |     |     |     |     |   |
| 0.8 | 418 |     | 428 | 299 |     |     |     |     |     |     |   |
| 0.9 | 420 |     | 410 |     |     |     |     |     |     |     |   |
| 1   |     |     |     |     |     |     |     |     |     |     |   |

~Hv300
Hv301~350
Hv351~400
Hv401~450
Hv451~

① MELTED AND SOLIDIFIED PORTION 463v

CONDITION 14

|     | 0   | 0.1 | 0.2 | 0.3 | 0.4 | 0.5 | 0.6 | 0.7 | 0.8 | 0.9 | 1 |
|-----|-----|-----|-----|-----|-----|-----|-----|-----|-----|-----|---|
| 0.1 | 423 | 447 | 423 | 466 | 424 | 444 | 312 | 209 | 231 | 206 | 211 |
| 0.2 | 435 |     | 444 | 432 |     |     |     |     |     |     |   |
| 0.3 | 426 | 463 | 435 | 412 | 406 | 288 | 220 | 219 | 224 | 206 | 192 |
| 0.4 | 441 |     | 410 | 374 |     |     |     |     |     |     |   |
| 0.5 | 438 |     | 422 | 407 |     |     |     |     |     |     |   |
| 0.6 | 325 |     | 340 | 301 |     |     |     |     |     |     |   |
| 0.7 | 301 |     | 345 | 327 |     |     |     |     |     |     |   |
| 0.8 | 321 |     | 330 | 315 |     |     |     |     |     |     |   |
| 0.9 | 321 |     | 321 |     |     |     |     |     |     |     |   |
| 1   |     |     |     |     |     |     |     |     |     |     |   |

REMELTED AND SOLIDIFIED PORTION
WIDTH: 1.05mm
DEPTH: 0.23mm

~Hv300
Hv301~350
Hv351~400
Hv401~450
Hv451~

① REMELTED AND SOLIDIFIED PORTION 435Hv
② REHEATED SOLIDIFIED PORTION 365Hv

CONDITION 15

| | 0 | 0.1 | 0.2 | 0.3 | 0.4 | 0.5 | 0.6 | 0.7 | 0.8 | 0.9 | 1 |
|---|---|---|---|---|---|---|---|---|---|---|---|
| 0.1 | 553 | 549 | 623 | 536 | 623 | 420 | 319 | 221 | 192 | 208 | 191 |
| 0.2 | 501 | | 555 | 516 | | | | | | | |
| 0.3 | 528 | 528 | 593 | 544 | 598 | 570 | 319 | 213 | 188 | 189 | 206 |
| 0.4 | 509 | | 540 | 450 | | | | | | | |
| 0.5 | 513 | | 500 | 516 | | | | | | | |
| 0.6 | 509 | | 542 | 666 | | | | | | | |
| 0.7 | 494 | | 466 | 480 | | | | | | | |
| 0.8 | 520 | | 460 | 401 | | | | | | | |
| 0.9 | 575 | | 456 | | | | | | | | |
| 1 | 520 | | 477 | | | | | | | | |

- ~Hv300
- Hv301~350
- Hv351~400
- Hv401~450
- Hv451~

① MELTED AND SOLIDIFIED PORTION 543Hv

CONDITION 16

| | 0 | 0.1 | 0.2 | 0.3 | 0.4 | 0.5 | 0.6 | 0.7 | 0.8 | 0.9 | 1 |
|---|---|---|---|---|---|---|---|---|---|---|---|
| 0.1 | 505 | 553 | 570 | 553 | 589 | 516 | 720 | 589 | 202 | 182 | |
| 0.2 | 570 | | 530 | 544 | | | | | | | |
| 0.3 | 566 | 570 | 584 | 593 | 726 | 655 | 315 | 199 | 192 | 181 | 164 |
| 0.4 | 593 | | 516 | 528 | | | | | | | |
| 0.5 | 347 | | 335 | 310 | | | | | | | |
| 0.6 | 367 | | 364 | 362 | | | | | | | |
| 0.7 | 376 | | 365 | 374 | | | | | | | |
| 0.8 | 396 | | 378 | 362 | | | | | | | |
| 0.9 | 394 | | 394 | 364 | | | | | | | |
| 1 | | | 359 | 353 | | | | | | | |

REMELTED AND SOLIDIFIED PORTION
WIDTH : 1.05mm
DEPTH : 0.23mm

- ~Hv300
- Hv301~350
- Hv351~400
- Hv401~450
- Hv451~

① REMELTED AND SOLIDIFIED PORTION 560Hv
② REHEATED SOLIDIFIED PORTION 415Hv

CONDITION 17

| | 0 | 0.1 | 0.2 | 0.3 | 0.4 | 0.5 | 0.6 | 0.7 | 0.8 | 0.9 | 1 |
|---|---|---|---|---|---|---|---|---|---|---|---|
| 0.1 | 666 | 677 | 670 | 680 | 685 | 393 | 284 | 285 | 292 | 294 | |
| 0.2 | 677 | | | 685 | | | | | | | |
| 0.3 | 671 | 671 | 695 | 683 | 575 | 396 | 291 | 282 | 285 | 275 | |
| 0.4 | 670 | | 666 | 645 | | | | | | | |
| 0.5 | 666 | | 635 | 598 | | | | | | | |
| 0.6 | 683 | | 625 | 643 | | | | | | | |
| 0.7 | 671 | | 640 | 689 | | | | | | | |
| 0.8 | 680 | | 597 | 707 | | | | | | | |
| 0.9 | 675 | | 625 | 695 | | | | | | | |
| 1 | 681 | | 505 | 483 | | | | | | | |

~Hv300
Hv301~350
Hv351~400
Hv401~450
Hv451~

①MELTED AND SOLIDIFIED PORTION 671Hv

CONDITION 18

| | 0 | 0.1 | 0.2 | 0.3 | 0.4 | 0.5 | 0.6 | 0.7 | 0.8 | 0.9 | 1 |
|---|---|---|---|---|---|---|---|---|---|---|---|
| 0.1 | 660 | 639 | 666 | 575 | 660 | 675 | 426 | 243 | 259 | 264 | |
| 0.2 | 666 | | 650 | 677 | | | | | | | |
| 0.3 | 649 | 689 | 700 | 671 | 412 | 381 | 283 | 251 | 245 | 260 | |
| 0.4 | 677 | | 551 | 369 | | | | | | | |
| 0.5 | 383 | | 394 | 336 | | | | | | | |
| 0.6 | 376 | | 399 | 426 | | | | | | | |
| 0.7 | 385 | | 370 | 360 | | | | | | | |
| 0.8 | 447 | | 425 | 450 | | | | | | | |
| 0.9 | 420 | | 410 | 390 | | | | | | | |
| 1 | 417 | | 435 | 440 | | | | | | | |

REMELTED AND SOLIDIFIED PORTION
WIDTH : 1.05mm
DEPTH : 0.23mm

~Hv300
Hv301~350
Hv351~400
Hv401~450
Hv451~

①REMELTED AND SOLIDIFIED PORTION 660Hv
②REHEATED SOLIDIFIED PORTION 453Hv

BUTT WELDED JOINT OF STEEL MATERIAL AND METHOD FOR MANUFACTURING SAME

TECHNICAL FIELD

The present invention relates to a butt-welded joint of steel materials with which the steel materials are welded to each other and to a method for manufacturing the same.

BACKGROUND ART

In the related art, in a welded joint for welding together welding target materials, an improvement in a joint strength has been desired, and various attempts have been made to improve the joint strength. For example, PTL 1 discloses a T-joint in which a welded portion has improved fatigue strength, which is achieved by remelting slag on the surface of the weld bead, thereby smoothing the texture of the surface of the weld bead. Furthermore, PTL 2 discloses a lap bonded joint in which a joint portion has improved cross tensile strength, which is achieved by radiating a laser beam onto a metal sheet to form a bond portion that has been melted and solidified and, further, reradiating a laser beam to an inside thereof, thereby providing, near a melt boundary of the bond portion, a reheated solidified portion having excellent toughness. Furthermore, PTL 3 discloses one in which variations in fatigue strength have been corrected as a result of performing rapid heating and rapid cooling repeatedly on the surface of a welded portion, thereby refining the crystal structure of the welded portion. On the other hand, regarding the fatigue strength of a butt-welded joint, which is obtained by welding together abutted steel materials that are to be joined together, although a further improvement is desired, weld structures that focus on the improvement in the fatigue strength of butt-welded joints and methods for manufacturing the same have not been known.

CITATION LIST

Patent Literature

PTL 1: Japanese Unexamined Patent Application Publication No. 59-110490
PTL 2: Japanese Unexamined Patent Application Publication No. 2017-52006
PTL 3: Japanese Unexamined Patent Application Publication No. 2002-256335

SUMMARY OF INVENTION

Technical Problem

Technical objects of the present invention are to provide a butt-welded joint of steel materials that has excellent fatigue strength and to provide a method for manufacturing the same.

Solution to Problem

To achieve the technical objects described above, a butt-welded joint of steel materials according to the present invention is provided. Base materials of the butt-welded joint are a pair of the steel materials, with end portions of the steel materials being abutted against each other. The butt-welded joint includes a welded portion formed to extend from surfaces of the base materials to an inner portion of the base materials and straddle the end portions. The base materials have a carbon concentration of 0.1 mass % or greater and 0.35 mass % or less. The welded portion includes a melted and solidified portion, a remelted and solidified portion, and a reheated solidified portion. The melted and solidified portion is a portion resulting from melting and solidification of the end portions of the pair of base materials, the melting being caused as a result of first heating from the surfaces. The remelted and solidified portion is a portion resulting from remelting and resolidification of the melted and solidified portion, the remelting being caused as a result of reheating of the melted and solidified portion from a surface thereof. The reheated solidified portion is a portion formed in an inner region relative to the remelted and solidified portion and having a structure resulting from a change in a structure of the melted and solidified portion, the change being due to the reheating, the change involving no melting. A width $W0$ of the melted and solidified portion, a depth $d0$ from a surface of the welded portion to a deepest portion of the melted and solidified portion, a width $W1$ of the remelted and solidified portion, and a depth $d1$ from the surface of the welded portion to a deepest portion of the remelted and solidified portion have the following relationships.

$$0.46 W0 \leq W1$$

$$0.14 d0 \leq d1 \leq 0.73 d0$$

In this instance, it is preferable that an average Vickers hardness value of the reheated solidified portion be lower than an average Vickers hardness value of the remelted and solidified portion.

Furthermore, it is preferable that a residual stress of a surface of the remelted and solidified portion be a compressive stress in a center region in a width direction of the remelted and solidified portion.

Furthermore, it is preferable that, at a terminal portion in a circumferential direction of the welded portion, a depth $h$, from the surface of the welded portion, of a recess formed in the remelted and solidified portion and the depth $d1$ of the remelted and solidified portion have the following relationship.

$$0.32 d1 \geq h$$

Note that in the present invention, it is preferable that the melted and solidified portion be formed as a result of keyhole welding, and the remelted and solidified portion and the reheated solidified portion be formed as a result of heat conduction welding.

In addition, the butt-welded joint of steel materials according to the present invention can be produced by a method for manufacturing a butt-welded joint of steel materials. The method includes abutting end portions of a pair of base materials made of the steel materials against each other and forming a welded portion in a manner such that the welded portion extends from surfaces of the base materials to an inner portion of the base materials and straddles the end portions. The base materials have a carbon concentration of 0.1 mass % or greater and 0.35 mass % or less. The welded portion is formed by a first step and a second step. The first step includes forming a melted and solidified portion by melting and solidifying the end portions of the pair of base materials, the melting being caused by first heating from the surfaces. The second step includes forming a remelted and solidified portion and a reheated solidified portion by reheating the melted and solidified portion from a surface thereof. The remelted and solidified portion is formed by remelting and resolidification of the melted and solidified portion. The reheated solidified portion is formed in an inner region relative to the remelted and solidified portion, with a structure of the reheated solidified portion resulting from a change in a structure of the melted and solidified portion, the change involving no melting. A width W0 of the melted and solidified portion, a depth d0 from a surface of the welded portion to a deepest portion of the melted and solidified portion, a width W1 of the remelted and solidified portion, and a depth d1 from the surface of the welded portion to a deepest portion of the remelted and solidified portion have the following relationships.

$$0.46W0 \leq W1$$

$$0.14d0 \leq d1 \leq 0.73d0$$

In this instance, it is preferable that, in the first step, the melted and solidified portion be formed by keyhole welding, and in the second step, the remelted and solidified portion and reheated solidified portion be formed by heat conduction welding.

Advantageous Effects of Invention

With the present invention, a butt-welded joint of steel materials that has higher fatigue strength than a base material can be obtained.

DESCRIPTION OF EMBODIMENTS

Figure 1:
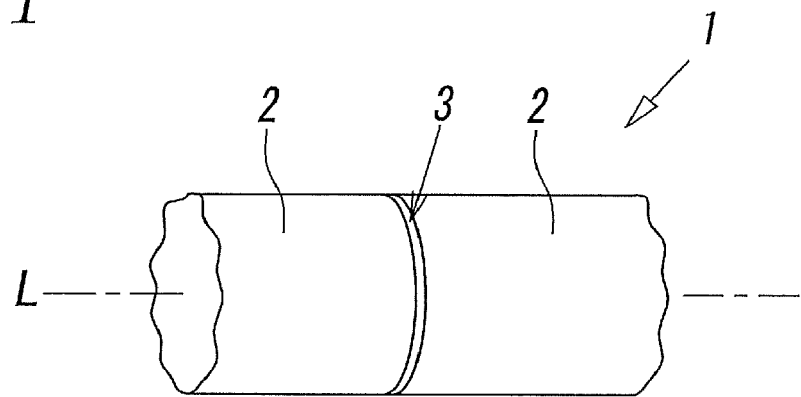
FIG. 1 is a diagram schematically illustrating a welded portion and its vicinity of a butt-welded joint of steel materials of the present invention.
Figure 2:
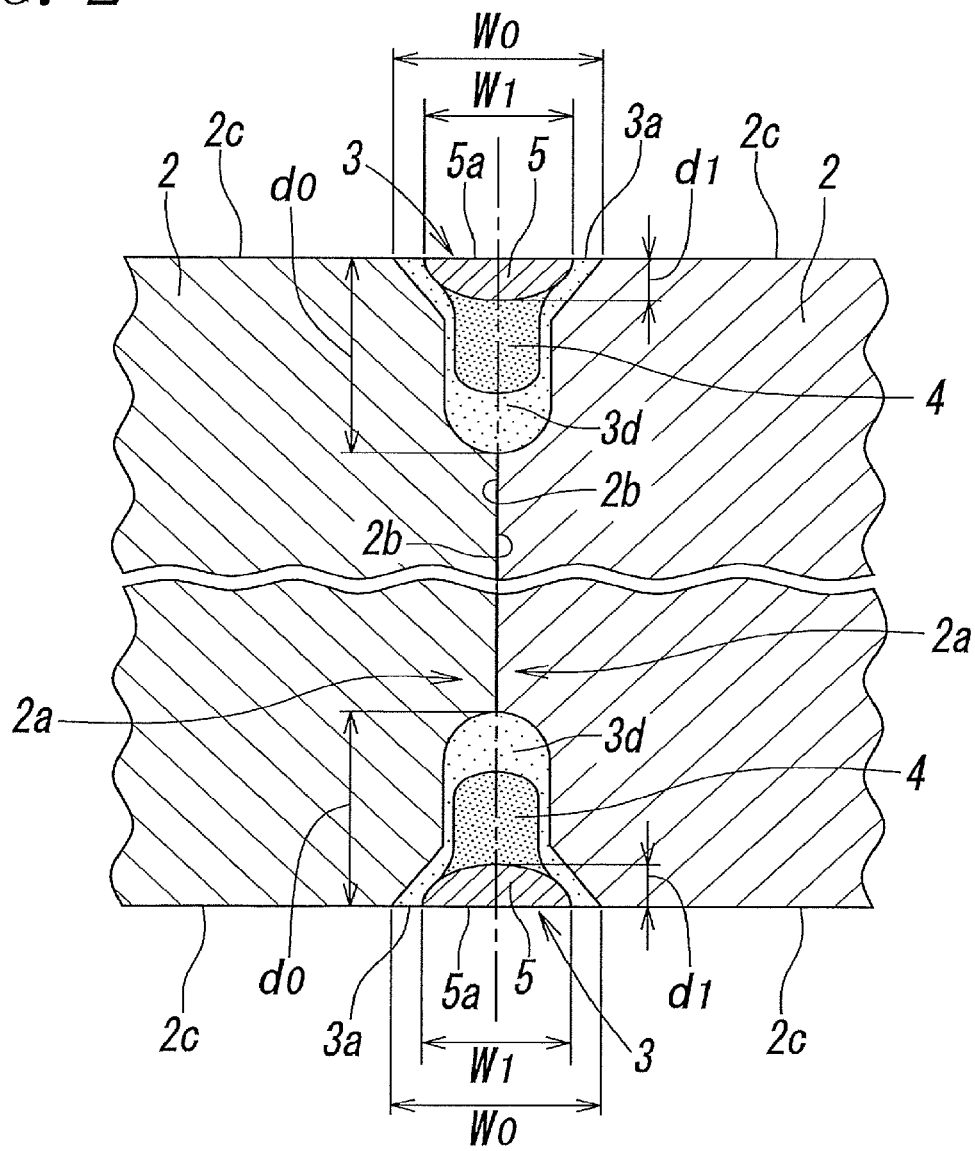
FIG. 2 is a diagram schematically illustrating a cross-sectional structure of the welded portion of FIG. 1.
Figure 3:
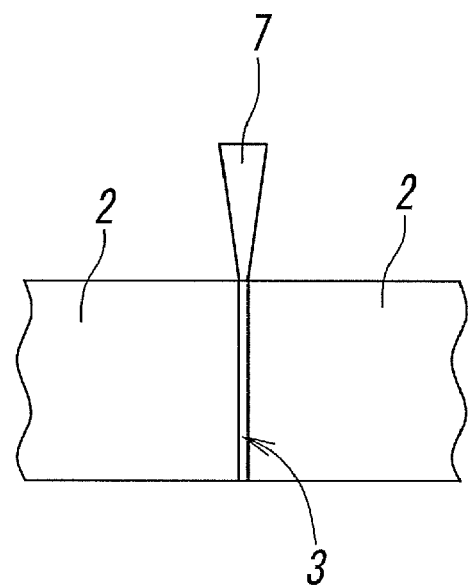
FIG. 3(a) is a diagram schematically illustrating laser radiation for an instance in which keyhole welding is performed.
FIG. 3(b) is a diagram schematically illustrating laser radiation for an instance in which heat conduction welding is performed.
Figure 3:
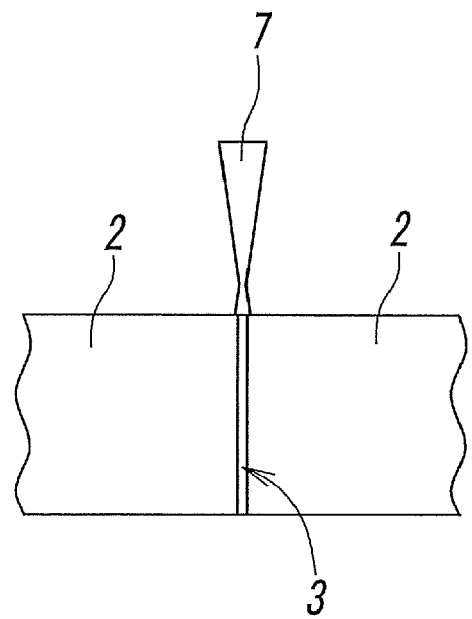

An embodiment of a butt-welded joint of steel materials according to the present invention will be described in detail below with reference to FIG. 1 to FIG. 7. As illustrated in FIG. 1 and FIG. 2, in a butt-welded joint 1 of steel materials (hereinafter also referred to simply as a "joint 1"), according to this embodiment, base materials 2, 2 are a pair of identical steel materials formed to have a cylindrical shape, and end portions 2a, 2a of the base materials 2, 2 are coupled to each other by a welded portion 3. Specifically, the welded portion 3 is formed such that end faces 2b, 2b of the end portions 2a, 2a of the base materials 2, 2 are abutted against each other (positioned to face each other) to be in contact with each other, and welding is performed thereon annularly in a manner such that the welded portion 3 extends from surfaces (outer circumferential surfaces) 2c, 2c of the base materials 2, 2 to an inner portion thereof along the end faces 2b, 2b, which are in contact with each other, and straddles the end portions 2a, 2a.

To be more specific, the welded portion 3 is formed in a manner in which keyhole welding is performed annularly on the end portions 2a, 2a of the base materials 2, 2 from the surfaces (outer circumferential surfaces) 2c, 2c, and thereafter, heat conduction welding is performed annularly from the surface, in an overlapping manner, on the portion on which the keyhole welding has been performed. In this instance, the keyhole welding and heat conduction welding are both performed with radiation of, for example, a beam 7 having a high power density, as illustrated in FIG. 3(a) and FIG. 3(b); here, an instance in which a laser 7 is used will be described. In the keyhole welding, heating (first heating) is performed with a laser 7 having a high power density, and, accordingly, a depression (keyhole) is formed in the end portions 2a, 2a of the base materials 2, 2. The laser 7 travels to an inner portion of the base materials 2, 2 through the depression, and, accordingly, deeper welding can be accomplished. In this instance, the portion melted by the keyhole welding is solidified by subsequent cooling to form a melted and solidified portion 3d, and a hardness thereof is higher than a hardness prior to the welding.

On the other hand, in the heat conduction welding, a laser 7 having a lower power density than that for the keyhole welding is used. In the heat conduction welding, the surfaces 2c, 2c and their vicinities of the melted and solidified portion 3d in the end portions 2a, 2a are reheated (second heating) and accordingly remelted and resolidified to form a remelted and solidified portion 5, and, concurrently, an inner region relative to the remelted and solidified portion 5 (a region at a greater depth from the surfaces) is modified by the reheating, without involving melting, to form a reheated solidified portion 4. Thus, as a result of the keyhole welding and the heat conduction welding, the welded portion 3 is formed to straddle the end portions 2a, 2a of the base materials 2, 2.

That is, the welded portion 3 is formed of the melted and solidified portion 3d, the remelted and solidified portion 5, and the reheated solidified portion 4. The melted and solidified portion 3d is a portion formed as a result of melting and solidification of the end portions 2a, 2a of the pair of base materials 2, 2, the melting being caused as a result of first heating (keyhole welding) from the surfaces 2c, 2c. The remelted and solidified portion 5 is a portion resulting from remelting and resolidification of the melted and solidified portion 3d, the remelting being caused as a result of reheating (heat conduction welding) of the melted and solidified portion 3d from the surfaces. The reheated solidified portion 4 is a portion that is formed in an inner region of the base materials 2, 2 relative to the remelted and solidified portion 5 (a region at a greater depth from the surfaces), and which has a structure resulting from a change in a structure of the melted and solidified portion 3d, the change being due to the reheating, the change involving no melting. In this instance, the structure of the reheated solidified portion 4 is a structure modified by tempering the structure of the melted and solidified portion 3d, which has been martensitized by the keyhole welding, by performing the heat conduction welding, and, therefore, a hardness is lower than that of the melted and solidified portion 3d, which results in improved toughness. On the other hand, a structure of the remelted and solidified portion 5 is a structure resulting from the remelting of the melted and solidified portion 3d, which is caused by the heat conduction welding, and the resolidification thereof, which is caused by the subsequent cooling, and, therefore, a hardness is higher than that of the reheated solidified portion 4.

Note that the melted and solidified portion 3d is deepest at a center in a width direction thereof (which is the location indicated by the dash-dot line of FIG. 2 and which, in this embodiment, substantially coincides with the location where the end faces 2b, 2b of the base materials 2, 2 are in contact with each other). A depth from the surface 3a of the welded portion 3 (i.e., a surface 5a of the remelted and solidified portion 5) to a deepest portion of the melted and solidified portion 3d is d0. Furthermore, the remelted and solidified portion 5 is also deepest at a center in a width direction thereof (which substantially coincides with the center in the width direction of the melted and solidified portion 3d). A depth from the surface 3a of the welded portion 3 (the surface 5a of the remelted and solidified portion 5) to a deepest portion of the remelted and solidified portion 5 is d1, which is smaller than d0. That is, the welded portion 3, the melted and solidified portion 3d, and the remelted and solidified portion 5 are formed such that the centers in the width directions thereof substantially coincide with one another, with symmetries being substantially formed about the centers, in the width direction.

It is known that a general property of steel materials such as chromium-molybdenum steel and carbon steel for machine structural use is that in a case where a carbon concentration thereof (i.e., a carbon content, specifically, a mass percentage of the carbon present in a base material) is high, a hardness of the steel material is high whereas a toughness thereof is low, and, on the other hand, in a case where the carbon concentration is low, the hardness of the steel material is low whereas the toughness thereof is high. Accordingly, to improve the fatigue strength of the joint 1, in which steel materials are base materials, it is necessary to ensure that the carbon concentration of the steel material is within a specified range so as to prevent an instance in which one of the hardness of the base material and the toughness thereof is low. Hence, herein, a carbon concentration (carbon content) of the base materials 2, 2 as a whole is specified to be 0.1 mass % or greater and 0.35 mass % or less.

From the results of an experiment, which will be described later, it was observed that in a case where base materials 2, 2 having a carbon concentration as described above are used, a butt-welded joint 1 having a higher rotating bending fatigue strength than that of the base materials 2, 2 can be obtained, provided that a width W0 of the melted and solidified portion 3d, the depth d0 of the melted and solidified portion 3d, a width W1 of the remelted and solidified portion 5, and the depth d1 of the remelted and solidified portion 5 satisfy the relationships of formula (1) and formula (2) below.

$$0.46 W0 \leq W1 \tag{1}$$

$$0.14 d0 \leq d1 \leq 0.73 d0 \tag{2}$$

Furthermore, portions of the surface 5a (i.e., the surface 3a of the welded portion 3) of the remelted and solidified portion 5, which is formed by performing keyhole welding and heat conduction welding in an overlapping manner, have residual stress generated therein. The residual stress is a compressive stress in a center region in the width direction of the remelted and solidified portion 5 (i.e., a center region in the width direction of the welded portion 3) and is a tensile stress in a region outside of the center region in the width direction. As a result, cracks are inhibited from forming in the center and its vicinity in the width direction of the welded portion 3, in the surface 5a of the remelted and solidified portion 5.

Figure 16:
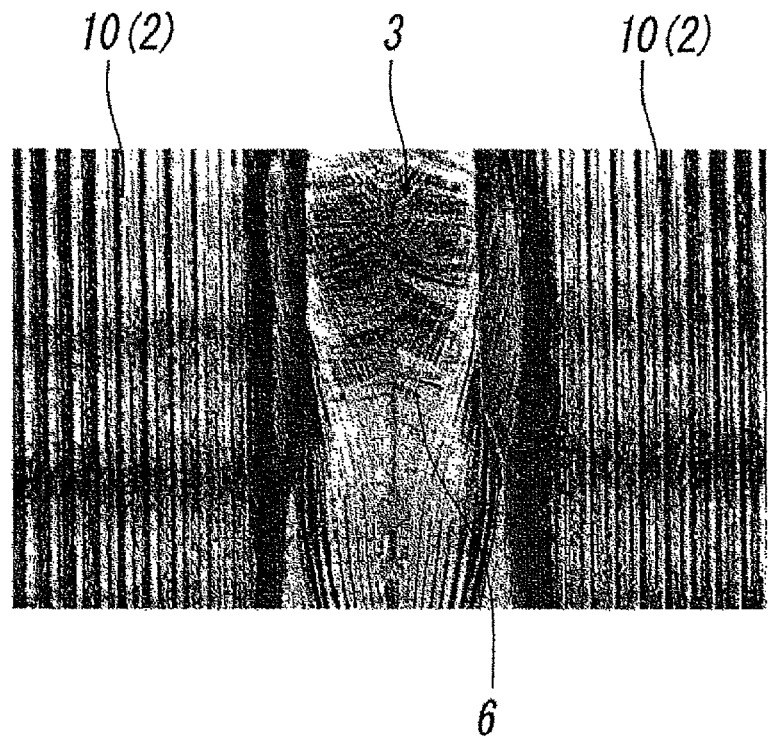
FIG. 16 is an enlarged photograph of a solidification terminal portion of a welded portion after keyhole welding was performed in a first example.
Figure 17:
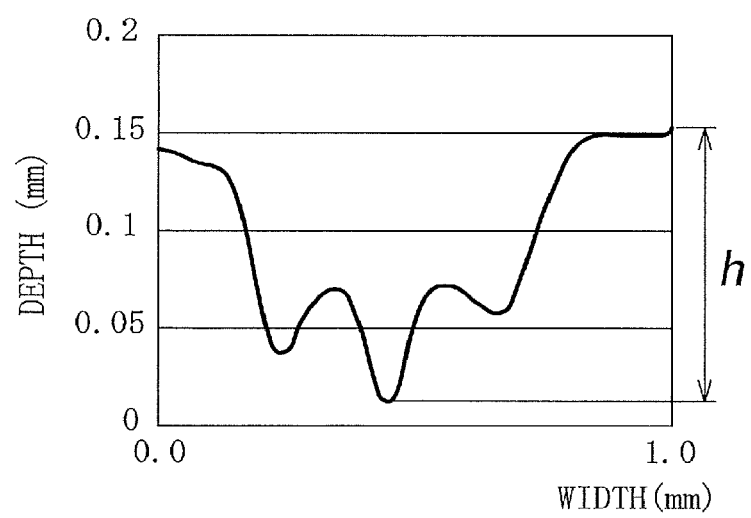
FIG. 17 is a graph of measurements of a recess depth of the solidification terminal portion shown in FIG. 16.
Figure 18:
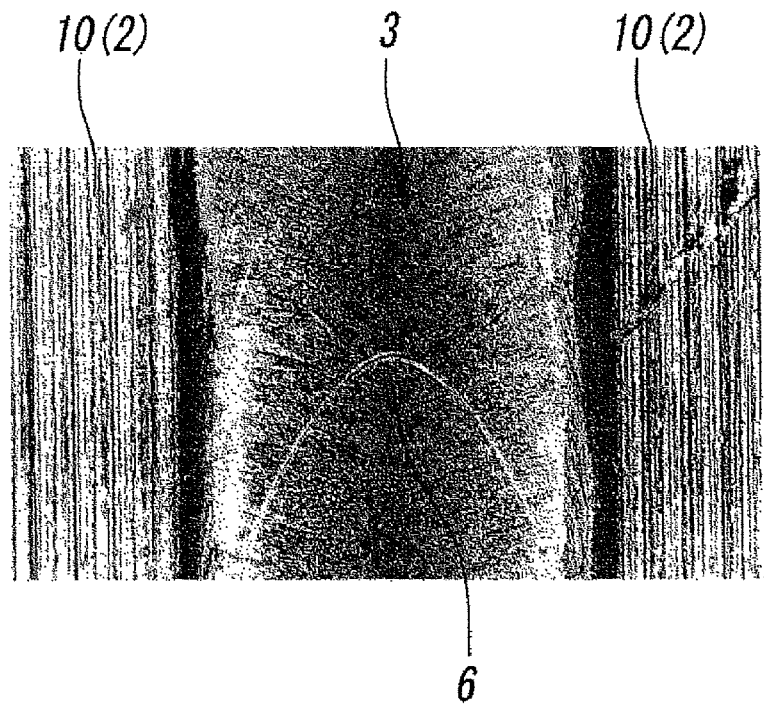
FIG. 18 is an enlarged photograph of a solidification terminal portion of a welded portion after heat conduction welding was performed in a first example.
Figure 19:
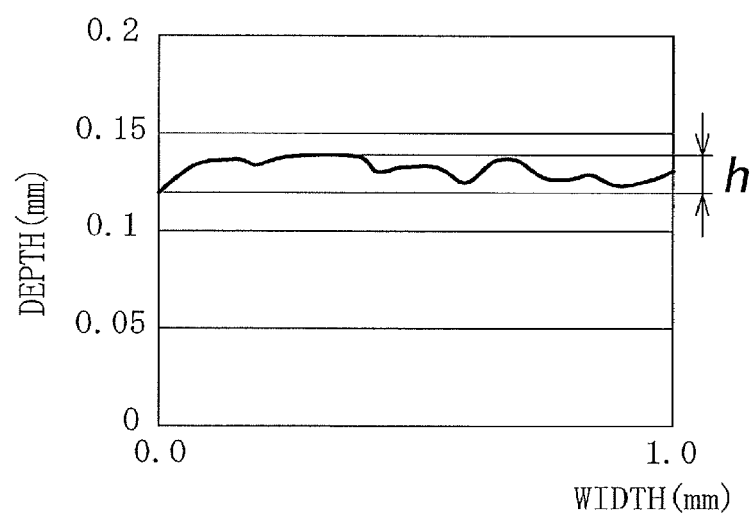
FIG. 19 is a graph of measurements of a recess depth of the solidification terminal portion shown in FIG. 18.
Figure 20:
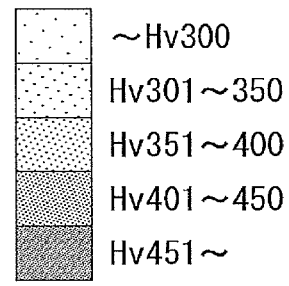
FIG. 20 is a diagram showing a hardness distribution of a sample welded exclusively by keyhole welding in S10C of a second example.
Figure 21:
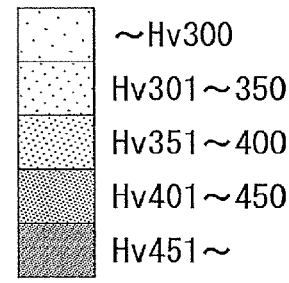
FIG. 21 is a diagram showing a hardness distribution of a sample welded by keyhole welding and heat conduction welding in S10C of a second example.
Figure 22:
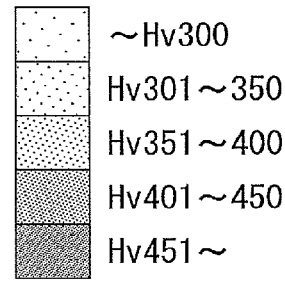
FIG. 22 is a diagram showing a hardness distribution of a sample welded exclusively by keyhole welding in S15C of a second example.
Figure 23:
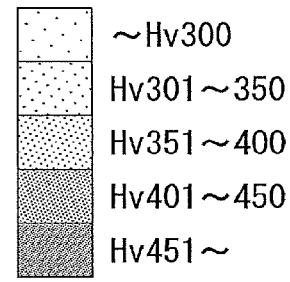
FIG. 23 is a diagram showing a hardness distribution of a sample welded by keyhole welding and heat conduction welding in S15C of a second example.
Figure 24:
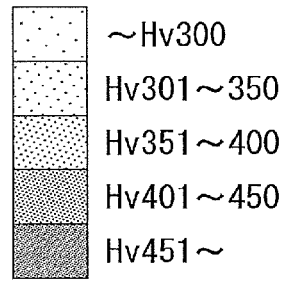
FIG. 24 is a diagram showing a hardness distribution of a sample welded exclusively by keyhole welding in S20C of a second example.
Figure 25:
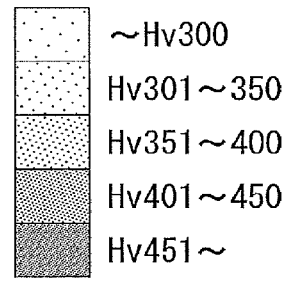
FIG. 25 is a diagram showing a hardness distribution of a sample welded by keyhole welding and heat conduction welding in S20C of a second example.
Figure 26:
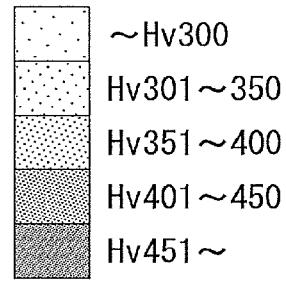
FIG. 26 is a diagram showing a hardness distribution of a sample welded exclusively by keyhole welding in S25C of a second example.

Furthermore, in both the keyhole welding and the heat conduction welding, the welding is carried out in a manner such that a starting portion of the weld and a terminal portion thereof (a solidification terminal portion 6, shown in FIG. 16 and FIG. 18), with respect to a circumferential direction, overlap each other at the same location. In the keyhole welding, a recess due to the radiation of the laser 7 is formed in the terminal portion at the completion of the keyhole welding (see FIG. 17). A depth (maximum depth) h of the recess from the surface of the welded portion can be reduced by, in the heat conduction welding, remelting and solidifying the welded portion resulting from the keyhole welding (i.e., the melted and solidified portion 3d), and, consequently, concentration of the stress that acts on the solidification terminal portion 6 can be inhibited. In addition, from the results of an experiment, which will be described later, it is desirable that the depth h of the recess from the surface 3a of the welded portion 3 and the depth d1 of the remelted and solidified portion 5 have the following relationship.

$$0.32 d_1 \geq h \quad (3)$$

Note that in the joint 1, the end faces 2b, 2b of the abutted base materials 2, 2 have a circular shape, but the shape is not limited thereto, and it is sufficient that the surfaces 2c, 2c of the abutted base materials 2, 2 are disposed substantially in the same plane; for example, the end faces 2b, 2b of base materials 2, 2 to be abutted against each other may have substantially the same shape and the same size.

EXAMPLES

Figure 4:
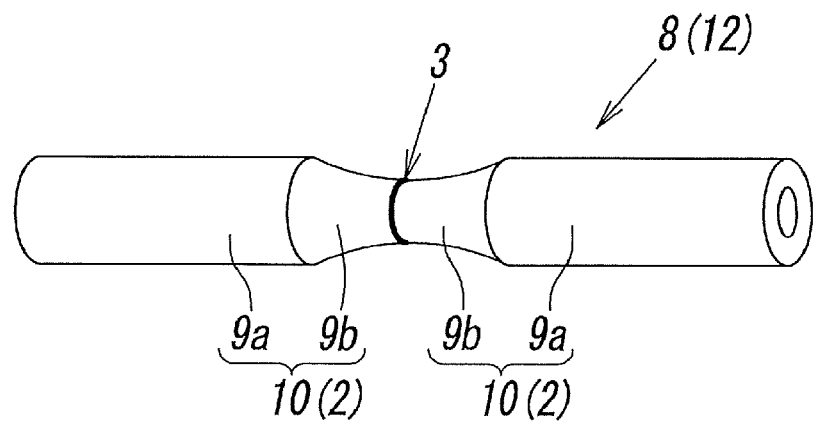
FIG. 4 is a diagram schematically illustrating a sample welded by butt welding.
Figure 5:
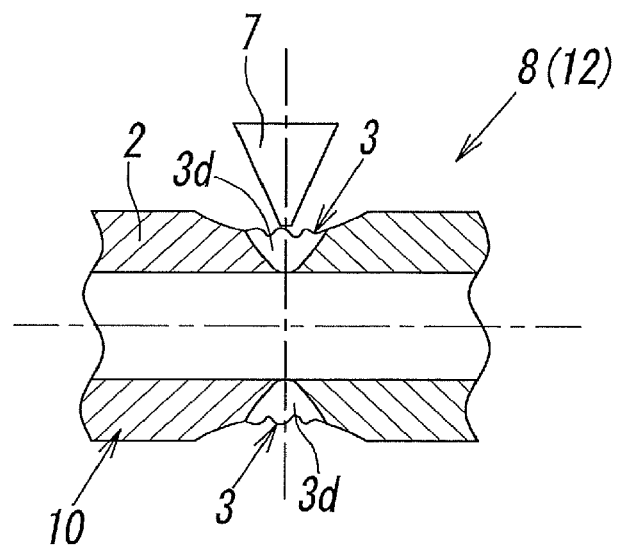
FIG. 5 is a cross-sectional view schematically illustrating a state in which keyhole welding is being performed during the preparation of the sample illustrated in FIG. 4.
Figure 6:
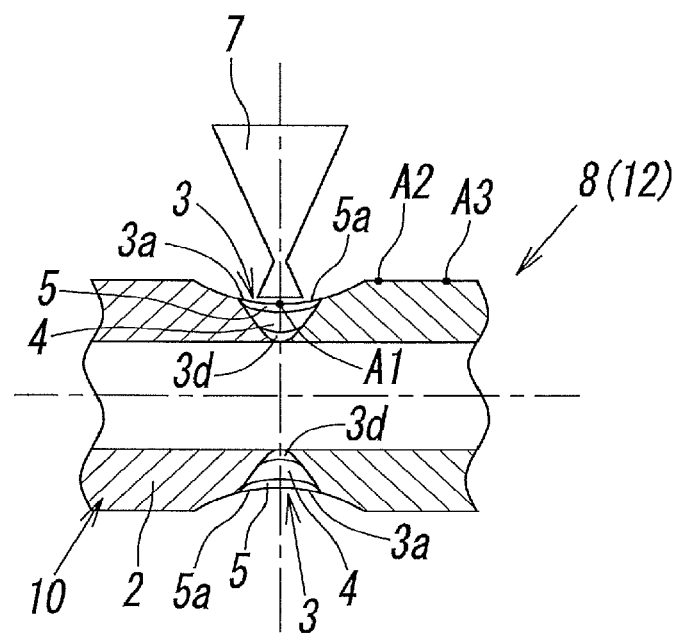
FIG. 6 is a cross-sectional view schematically illustrating a state in which heat conduction welding is being performed during the preparation of the sample illustrated in FIG. 4.
Figure 7:
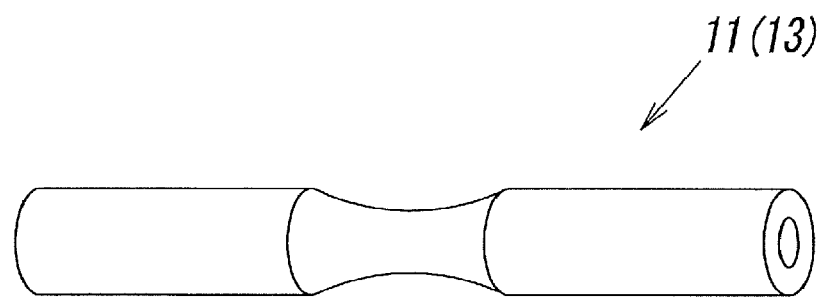
FIG. 7 is a diagram schematically illustrating a sample prepared by integral forming.

Now, first examples of the present invention (test conditions 2 to 7 in Table 1 and Table 2) and second examples thereof (test conditions 10, 12, 14, 16, and 18 in Table 3 and Table 4) will be described in comparison with first comparative examples (test conditions 1 and 8 in Table 1 and Table 2) and second comparative examples (test conditions 9, 11, 13, 15, and 17 in Table 3 and Table 4), respectively. Specimens 8 used in the first and second examples were prepared as follows: as illustrated in FIG. 4 to FIG. 6, a sample 10, which served as the base material 2, in which a hollow cylindrical body portion 9a was integrally formed with a hollow end portion 9b, which was tapered toward a distal end from the body portion 9a, were used; and end portions 9b of a pair of the samples 10 were butt-welded together by keyhole welding and heat conduction welding as described above.

In the first examples, laser welding conditions for the heat conduction welding were varied to change a size of the remelted and solidified portion 5, and thus, a variety of physical property values of the welded portion 3, which accordingly changed, were measured with the specimens 8 and evaluated. On the other hand, in the second examples, the carbon concentration (carbon content) of the sample 10 was varied, and thus, a variety of physical property values of the welded portion 3, which accordingly changed, were measured with the specimens 8 and evaluated.

Note that regarding the sample 10 used, a full length thereof was 80 mm, an outside diameter of the body portion 9a was 20 mm, an outside diameter of the distal end face of the end portion 9b was 14 mm, and inside diameters of the body portion 9a and the end portion 9b were 12 mm.

The sample 10 used in the first examples was made of chromium-molybdenum steel material (SCM415) and contained 0.13 mass % to 0.18 mass % C, 0.15 mass % to 0.35 mass % Si, 0.60 mass % to 0.90 mass % Mn, 0.030 mass % or less P, 0.030 mass % or less S, 0.25 mass % or less Ni, 0.90 mass % to 1.20 mass % Cr, and 0.15 mass % to 0.25 mass % Mo. In the first examples, under the conditions in which a laser output, a welding speed, a focal point diameter (spot diameter) for the keyhole welding were fixed (i.e., the width W0 and the depth d0 of the melted and solidified portion 3d were fixed), the laser output, the welding speed, and the focal point diameter (spot diameter) for the heat conduction welding were varied to change the width W1 and the depth d1 of the remelted and solidified portion 5; accordingly, the residual stress of the surface 3a of the welded portion 3 and its vicinity, an average hardness of the welded portion 3, the recess depth h of the solidification terminal portion 6 of the welded portion 3, and the rotating bending fatigue strength of the prepared specimens 8 were measured.

In the keyhole welding and the heat conduction welding, a fiber laser welding machine was used. By radiating a laser 7 by using the welding machine, welding of the sample 10, which served as the base material 2, was carried out. The switching between the keyhole welding and the heat conduction welding was carried out by moving a condenser lens of the welding machine in a direction of an axis L of the joint 1, that is, in a direction perpendicular to an abutting direction, thereby changing the focal point diameter of the laser 7, which was radiated onto the abutted portion of the end portions 9b, 9b of the pair of samples 10, 10 (the contact portion of the end faces). In performing the keyhole welding, which required a higher power density, a laser 7 having a narrowed, small focal point diameter was used, as illustrated in FIG. 3(a). On the other hand, in performing the heat conduction welding, in which the power density needed to be reduced compared with that of the laser 7 for the keyhole welding, a laser 7 having a focal point diameter larger than that for the keyhole welding was used, as illustrated in FIG. 3(b).

Furthermore, the specimens 8 of the first comparative examples (Conditions 1 and Conditions 8) were prepared from a sample that had the same shape and size and was made of the same material (SCM415) as the sample 10 used in the first examples. In this instance, the specimen 8 for Conditions 1 was prepared by butt-welding a pair of the samples 10 together, exclusively by keyhole welding. On the other hand, the specimen 8 for Conditions 8 was prepared by butt-welding a pair of the samples 10 together, under welding conditions in which the width and the depth of the remelted and solidified portion 5 were reduced compared with those of the specimens 8 of the first examples 1, by changing the laser output, the welding speed, and the focal point diameter for the heat conduction welding that was performed after the keyhole welding. In the first comparative examples, for the prepared specimens 8, the residual stress of the surface 3a of the welded portion and its vicinity, an average hardness of the welded portion 3, the recess depth of the solidification terminal portion 6 of the welded portion 3, and the rotating bending fatigue strength were measured. The welding conditions and the measurement results of the first examples and the first comparative examples are shown in Table 1 and Table 2 below.

TABLE 1

| | TEST CONDITIONS | CARBON CONTENT OF MATERIAL wt % | WELDING CONDITIONS | | | | REMELTING CONDITIONS |
|---|---|---|---|---|---|---|---|
| | | | KEYHOLE WELDING CONDITIONS | | | | |
| | | | LASER OUTPUT (W) | WELDING SPEED (mm/s) | FOCAL POINT DIAMETER (mm) | SHIELDING GAS | LASER OUTPUT (W) |
| COMPARATIVE EXAMPLE | 1 | SCM415 CO. 15 wt % | 850 | 50 | 0.5 | NITROGEN | — |
| EXAMPLE | 2 | | | | | | 850 |
| EXAMPLE | 3 | | | | | | 850 |
| EXAMPLE | 4 | | | | | | 850 |
| EXAMPLE | 5 | | | | | | 600 |
| EXAMPLE | 6 | | | | | | 400 |
| EXAMPLE | 7 | | | | | | 600 |
| COMPARATIVE EXAMPLE | 8 | | | | | | 350 |

| | WELDING CONDITIONS REMELTING CONDITIONS | | | SHAPE OF MELTED AND SOLIDIFIED PORTION | | | |
|---|---|---|---|---|---|---|---|
| | WELDING SPEED (mm/s) | FOCAL POINT DIAMETER (mm) | SHIELDING GAS | MELTED AND SOLIDIFIED PORTION (mm) | | REWELTED AND SOLIDIFIED PORTION (mm) | |
| | | | | WIDTH W0 | DEPTH d0 | WIDTH W1 | DEPTH d1 |
| COMPARATIVE EXAMPLE | — | — | NITROGEN | 1 | 1 | — | — |
| EXAMPLE | 50 | 1.5 | | | | 1.05 | 0.23 |
| EXAMPLE | 50 | 2.2 | | | | 1.01 | 0.16 |
| EXAMPLE | 50 | 0.9 | | | | 0.95 | 0.33 |
| EXAMPLE | 50 | 1.5 | | | | 0.82 | 0.15 |
| EXAMPLE | 50 | 1.5 | | | | 0.46 | 0.14 |
| EXAMPLE | 50 | 0.4 | | | | 0.75 | 0.73 |
| COMPARATIVE EXAMPLE | 200 | 0.4 | | | | 0.35 | 0.08 |

TABLE 2

| | TEST CONDITIONS | RESIDUAL STRESS (MPa) | | | AVERAGE HARDNESS (Hv) | | RECESS DEPTH OF SOLIDIFICATION TERMINAL PORTION (mm) | FATIGUE STRENGTH (BASE MATERIAL: 260 MPa) | EVALUATION |
|---|---|---|---|---|---|---|---|---|---|
| | | A1 | A2 | A3 | POSITION ① | POSITION ② | | | |
| COMPARATIVE EXAMPLE | 1 | 135 | 288 | 152 | 461 | — | 0.14 | 130 | x |
| EXAMPLE | 2 | −263 | 178 | 93 | 460 | 387 | 0.01 | 360 | ○ |
| EXAMPLE | 3 | −218 | 240 | 125 | 468 | 372 | 0.05 | 350 | ○ |
| EXAMPLE | 4 | −282 | 205 | 115 | 443 | 384 | 0.06 | 300 | ○ |
| EXAMPLE | 5 | −100 | 262 | 120 | 470 | 395 | 0.03 | 300 | ○ |
| EXAMPLE | 6 | −290 | 293 | 194 | 469 | 399 | 0.03 | 290 | ○ |
| EXAMPLE | 7 | −188 | 250 | 130 | 469 | 362 | — | 270 | ○ |
| COMPARATIVE EXAMPLE | 8 | −45 | 270 | 144 | 498 | 458 | 0.02 | 160 | x |

As shown in Table 1, in all of Conditions 1 to 8, the welding conditions for the keyhole welding were such that a laser output was 850 W, a welding speed was 50 mm/s, a focal point diameter was 0.5 mm, and nitrogen was used as a shielding gas for shielding the welding site from air. Accordingly, melted and solidified portions 3d having a width W0 of 1 mm and a depth d0 of 1 mm were formed. Furthermore, regarding Conditions 2 to 8, the welding conditions for the heat conduction welding were adjusted such that a laser output was 350 W to 850 W, a welding speed was 50 mm/s or 200 mm/s, a laser focal point diameter was 0.4 mm to 2.2 mm, and nitrogen was used as a shielding gas. Accordingly, remelted and solidified portions 5 having different widths W1 and depths d1 were formed.

The residual stress of the welded portion 3 and its vicinity in the surface were measured by using an X-ray stress measurement method in which an X-ray having a specific wavelength was radiated onto a surface of the specimens 8. As illustrated in FIG. 6, under Conditions 1 to Conditions 8, the residual stress was measured at each of three points, namely, a measurement point A1, which was located on the surface 3*a* of the center in the width direction of the welded portion 3; a measurement point A2, which was located 1.5 mm to the proximal end side (one end side of the specimens 8) of the sample 10 from the measurement point A1; and a measurement point A3, which was located 1 mm further to the proximal end side from the measurement point A2. In this instance, under Conditions 1, the residual stress at the center point in the width direction of the melted and solidified portion 3*d* was measured at the measurement point A1, and the residual stress at points where the structure had not been changed by the welding was measured at the measurement point A2 and the measurement point A3. Furthermore, under Conditions 2 to Conditions 8, the residual stress at the center point in the width direction of the remelted and solidified portion 5 was measured at the measurement point A1, and the residual stress at points where the structure had not been changed by the welding was measured at the measurement point A2 and the measurement point A3.

The results demonstrated that under Conditions 2 to 8, the residual stress at the measurement point A1 was a negative value, that is, a compressive stress was present at and near the measurement point A1. Accordingly, under Conditions 2 to Conditions 8, the formation of cracks can be inhibited at and near the measurement point A1 of the remelted and solidified portion 5. Furthermore, under Conditions 2 to Conditions 7, the residual stress at the measurement point A1 was less than or equal to −100 MPa. Under these conditions, as will be described later, the rotating bending fatigue strengths of the specimens 8 were higher than that of a specimen 11 for comparison (i.e., the base material itself), which had the same shape and size as the specimens 8 and were seamlessly integrally formed of the same material (SCM415) as that for the sample 10. On the other hand, it was demonstrated that in the specimen 8 for Conditions 1, the residual stress at the measurement point A1 of the melted and solidified portion 3*d* was a positive value, and, therefore, a tensile stress was present at and near the measurement point A1. Accordingly, under Conditions 1, the formation of cracks at and near the measurement point A1 cannot be inhibited, and, moreover, the formation and propagation of cracks may be promoted.

Regarding the hardness of the specimens 8, the Vickers hardness of the base material that included the reheated solidified portion 4 and the remelted and solidified portion 5 of the specimens 8 was measured and evaluated. For the measurement of the Vickers hardness, a typical Vickers' microhardness tester was used. The specimens 8 were cut along the axial direction, and, on the cut surface, the Vickers hardness was measured at an interval of 0.1 mm in a longitudinal direction (the lateral direction in FIG. 8 to FIG. 15) and in a transverse direction (the vertical direction in FIG. 8 to FIG. 15). As shown in FIG. 9 to FIG. 15, the results indicated that under Conditions 2 to Conditions 8, an average Vickers hardness value of the reheated solidified portion 4 was lower than an average Vickers hardness value of the remelted and solidified portion 5.

Figure 8:
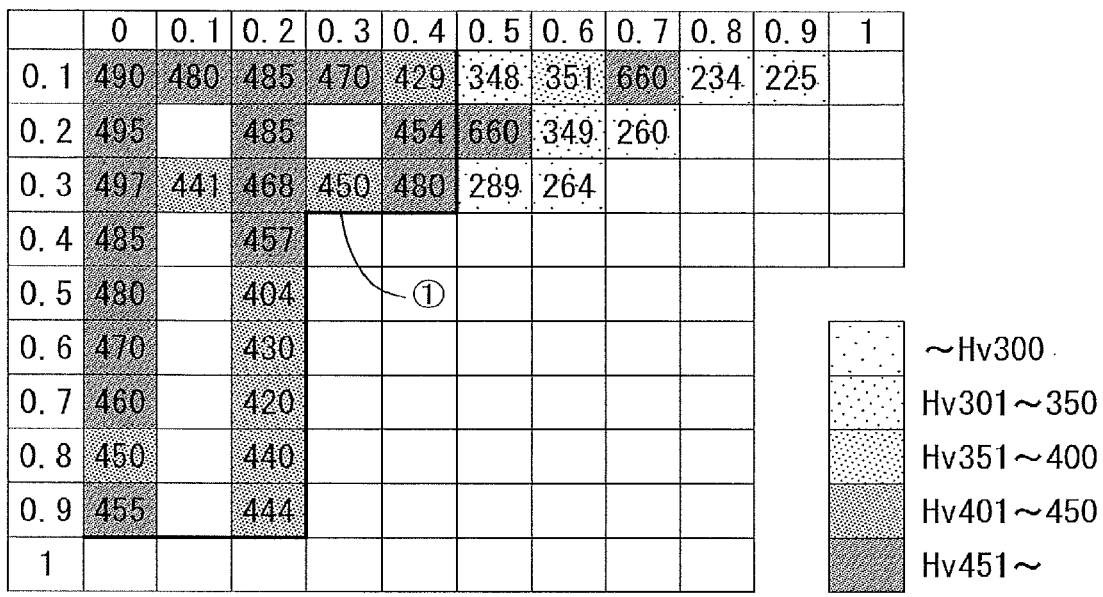
FIG. 8 is a diagram showing a hardness distribution of a sample welded exclusively by keyhole welding in a first example.
Figure 9:
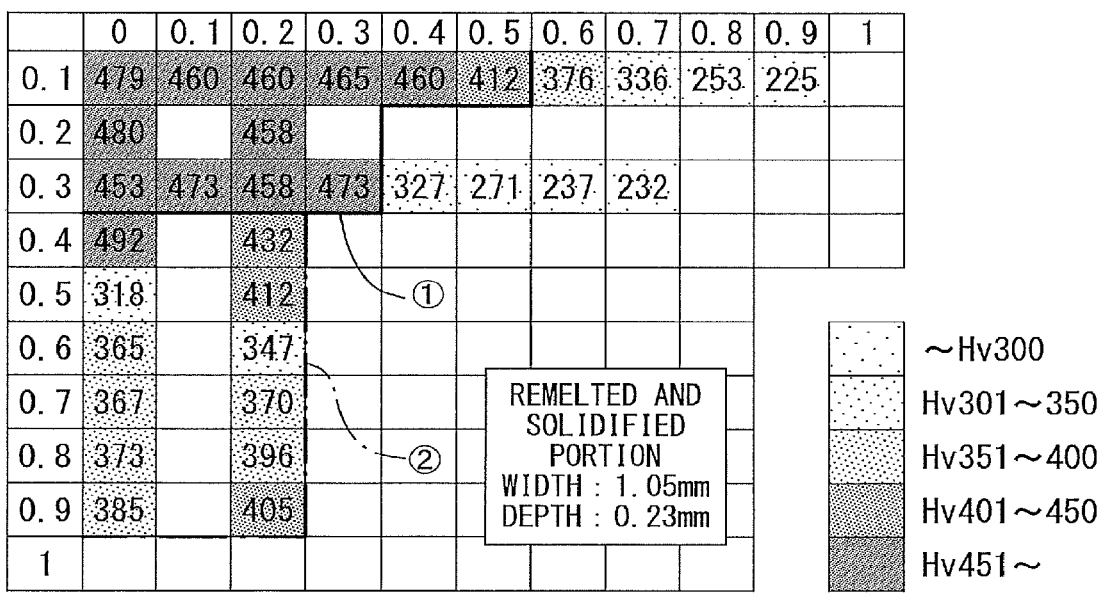
FIG. 9 is a diagram showing a hardness distribution of a sample welded by keyhole welding and heat conduction welding in a first example.
Figure 10:
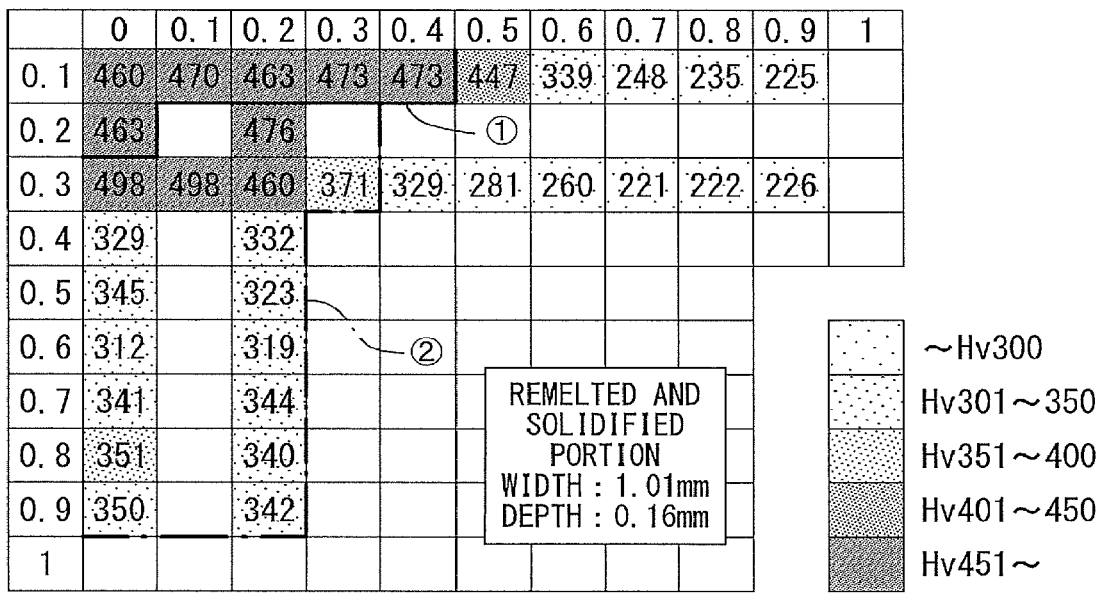
FIG. 10 is a diagram showing a hardness distribution of a sample welded under heat conduction welding conditions different from the evaluation of the hardness distribution shown in FIG. 9.
Figure 11:
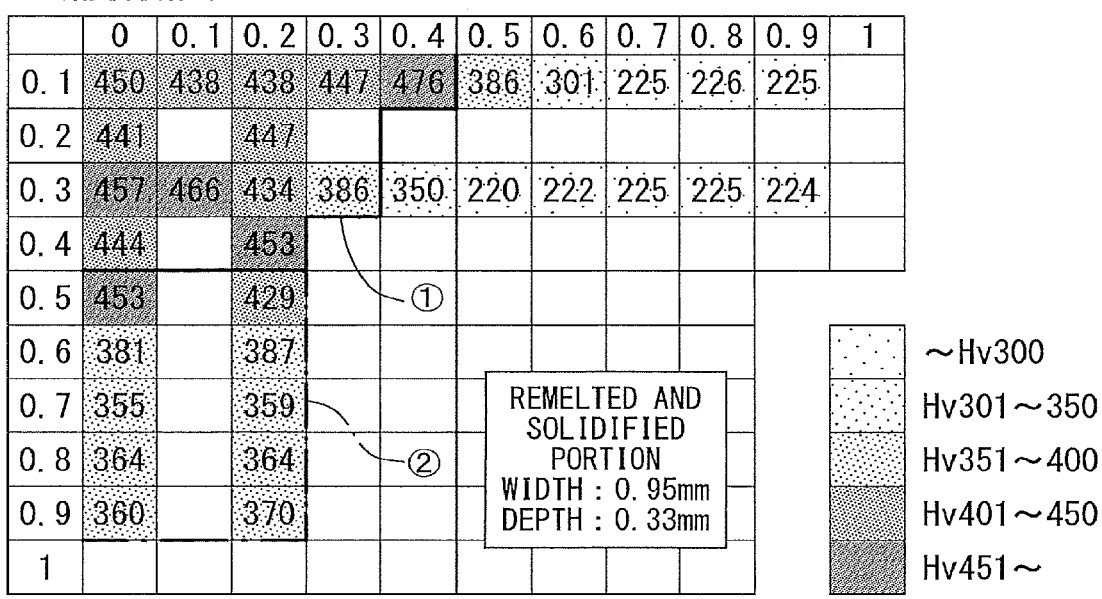
FIG. 11 is a diagram showing a hardness distribution of a sample welded under heat conduction welding conditions different from the evaluations of the hardness distributions shown in FIG. 9 and FIG. 10.
Figure 12:
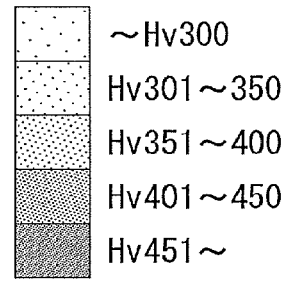
FIG. 12 is a diagram showing a hardness distribution of a sample welded under heat conduction welding conditions different from the evaluations of the hardness distributions shown in FIG. 9 to FIG. 11.
Figure 13:
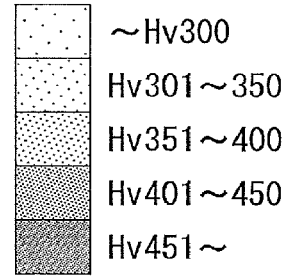
FIG. 13 is a diagram showing a hardness distribution of a joint welded under heat conduction welding conditions different from the evaluations of the hardness distributions shown in FIG. 9 to FIG. 12.
Figure 14:
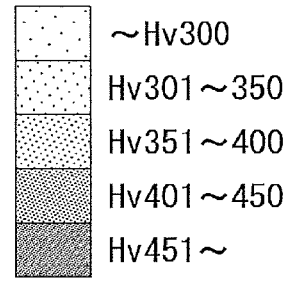
FIG. 14 is a diagram showing a hardness distribution of a joint welded under heat conduction welding conditions different from the evaluations of the hardness distributions shown in FIG. 9 to FIG. 13.
Figure 15:
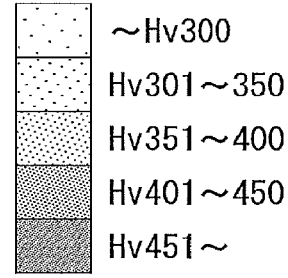
FIG. 15 is a diagram showing a hardness distribution of a joint welded under heat conduction welding conditions different from the evaluations of the hardness distributions shown in FIG. 9 to FIG. 14.

As shown in FIG. 8, a measurement of the Vickers hardness associated with Conditions 1 revealed that the numerical value of the Vickers hardness of the melted and solidified portion 3*d*, which resulted from melting by keyhole welding and solidification, was higher than the numerical values of the Picker's heights of other portions of the joint. Presumably, this is because the structure of the melted and solidified portion 3*d* had been martensitized by the keyhole welding. Furthermore, at the site of (0.1 mm, 0.7 mm) and the site of (0.2 mm, 0.5 mm), which corresponds to (vertical, lateral), shown in FIG. 8, the Vickers hardness of the joint was 660 Hv, which was a very high numerical value compared with those of the other sites. Presumably, this is because the two sites were located at or near the boundary between the melted portion associated with the keyhole welding and the heat affected zone, which was hardened under the influence of the heating for the keyhole welding, and, therefore, a cooling rate after the keyhole welding was fast, and, consequently, the structure at and near the boundary was martensitized.

Furthermore, as shown in FIG. 16 to FIG. 19, the recess depth h of the solidification terminal portion 6 of the welded portion 3 is a maximum height difference of a crater (recess), which was formed in a region onto which the laser was finally radiated when the base materials 2, 2 were welded together. The recess depth h of the solidification terminal portion 6 was 0.14 mm under Conditions 1, in which keyhole welding was exclusively performed, whereas the recess depth h was 0.01 mm to 0.06 mm under Conditions 2 to Conditions 8, in which heat conduction welding was performed after keyhole welding. Furthermore, under Conditions 2 to Conditions 8, the recess depth h of the solidification terminal portion 6 of the remelted and solidified portion 5 and the depth d1 of the remelted and solidified portion 5 had the relationship of formula (3) mentioned above.

Hence, by performing heat conduction welding after keyhole welding, the recess depth h of the solidification terminal portion 6 can be reduced, and as a result, concentration of the stress that acts on the solidification terminal portion 6 can be inhibited.

Regarding a rotating bending fatigue test (ISO 1143: 2010) for measuring the rotating bending fatigue strength, an ONO-type rotating-bending fatigue tester of the four-point loading type was used. In the tester, both ends of the specimen were held by the distal ends of a pair of spindles, and the load at which breakage occurred (i.e., a maximum value of the cyclic stresses that acted on a center portion (welded portion 3) in the axial direction of the specimen 8) in a case where rotation was performed 20 million times at a rotational speed of 2000 rpm was measured. Furthermore, to evaluate the measured rotating bending fatigue strength of the specimens 8, the rotating bending fatigue strength of the above-mentioned specimen 11 for comparison was measured in a similar manner. The result was that under Conditions 1, the rotating bending fatigue strength of the specimen 8 was a value lower than that of the rotating bending fatigue strength of the specimen 11 for comparison. Presumably, this is because in a case where keyhole welding was exclusively performed, the structure of the welded portion was martensitized and, consequently, had a fragile construction.

Furthermore, in the cases of Conditions 2 to Conditions 7, that is, in the cases where the width W0 of the melted and solidified portion 3*d*, the depth d0 of the melted and solidified portion 3*d*, the width W1 of the remelted and solidified portion 5, and the depth d1 of the remelted and solidified portion 5 simultaneously satisfied the relationships of formula (1) and formula (2) mentioned above, the rotating bending fatigue strengths of all the specimens 8 were higher than the rotating bending fatigue strength of the specimen 11 for comparison (that is, the rotating bending fatigue strength of the base material itself (base material strength). Presumably, this is because as a result of performing heat conduction welding in an overlapping manner on the portion on which keyhole welding had been performed, the reheated solidified portion 4, which was formed in an inner region relative to the remelted and solidified portion 5 in the welded portion 3 (a region at a deeper location with respect to the surface 3*a*), had a low hardness and, therefore, had a high toughness compared with the remelted and solidified portion 5, which was formed in a region closer to the surface 3*a* of the welded portion 3, and, consequently, even if cracks had been formed in the surface 3*a* of the welded portion 3, the cracks would not have easily propagated to an inner portion. On the other hand, under Conditions 8, the rotating bending fatigue strength of specimen 8 was a value lower than that of the rotating bending fatigue strength of the specimen 11 for comparison. Presumably, this is because the energy density of the laser in performing the heat conduction welding was lower than those for the other conditions, and, consequently, the reheated solidified portion 4 was not formed deeply into an inner portion of the welded portion.

From the measurement results described above, it was determined that under Conditions 2 to Conditions 7, the fatigue strength was improved, because the rotating bending fatigue strengths of the specimens 8, which were prepared by butt-welding together the samples 10, 10, which served as the base materials 2, 2, were higher than the rotating bending fatigue strength of the specimen 11 for comparison (base material itself), which was integrally formed of a single base material. Furthermore, it was determined that under Conditions 1 and Conditions 8, the fatigue strength was not improved, because the rotating bending fatigue strengths of the specimens 8, which were formed by butt-welding together the pair of samples 10, 10, were lower than the rotating bending fatigue strength of the specimen 11 for comparison.

Now, the second examples of the present invention will be described in comparison with the second comparative examples. In the second examples, a sample 10, which served as the base material 2, was formed from carbon steel for machine structural use, and specimens 12, which were obtained by butt-welding a pair of the samples 10, 10 together by keyhole welding and heat conduction welding, were used. In this instance, the sample 10 used had the same shape and size as that used in the first examples. Furthermore, as the carbon steel for machine structural use that formed the sample 10, S10C, S15C, S20C, S25C, and S35C were used. The S10C contained 0.15 mass % to 0.35 mass % Si, 0.30 mass % to 0.60 mass % Mn, 0.030 mass % or less P, 0.035 mass % or less S, and 0.08 mass % to 0.13 mass % C. The S15C contained the same mass percentages of Si, Mn, P, and S as the S10C and 0.13 mass % to 0.18 mass % C. The S20C contained the same mass percentages of Si, Mn, P, and S as the S10C and 0.18 mass % to 0.23 mass % C. The S25C contained the same mass percentages of Si, Mn, P, and S as the S10C and 0.22 mass % to 0.28 mass % C. The S35C contained the same mass percentages of Si, P, and S as the S10C, 0.60 mass % to 0.90 mass % Mn, and 0.32 mass % to 0.38 mass % C.

On the other hand, specimens 12 of the second comparative examples were prepared by butt-welding together, exclusively by keyhole welding, a pair of samples 10, 10, which had the same shape and size as the sample 10 used for each of the welding conditions of the second examples and were made of the same carbon steel for machine structural use. For each of the specimens 12 of the second examples and each of the specimens 12 of the second comparative examples, the residual stress of the surface 3*a* of the welded portion 3 and its vicinity, the average hardness of the welded portion 3, the recess depth h of the solidification terminal portion of the welded portion 3, and the rotating bending fatigue strength were measured and evaluated. The welding conditions and the measurement results of the second examples and the second comparative examples are shown in Table 3 and Table 4 below. Note that regarding S45C, which contained the same mass percentages of Si, Mn, P, and S as the S35C and 0.42 mass % to 0.48 mass % C, cracks were formed in the welded portion at a stage when the melted portion resulting from the keyhole welding was solidified, and thus a tendency for cracking was exhibited; therefore, it was determined at this stage that the fatigue strength was evidently low, and, accordingly, the variety of measurements and associated evaluations were not conducted.

TABLE 3

| | TEST CONDITIONS | CARBON CONTENT OF MATERIAL wt % | WELDING CONDITIONS | | | | REMELTING CONDITIONS |
|---|---|---|---|---|---|---|---|
| | | | KEYHOLE WELDING CONDITIONS | | | | |
| | | | LASER OUTPUT (W) | WELDING SPEED (mm/s) | FOCAL POINT DIAMETER (mm) | SHIELDING GAS | LASER OUTPUT (W) |
| COMPARATIVE EXAMPLE | 9 | S10C CO. 1 wt % | 850 | 50 | 0.5 | NITROGEN | — |
| EXAMPLE | 10 | | | | | | 850 |
| COMPARATIVE EXAMPLE | 11 | S15C CO. 15 wt % | | | | | — |
| EXAMPLE | 12 | | | | | | 850 |
| COMPARATIVE EXAMPLE | 13 | S20C CO. 20 wt % | | | | | — |
| EXAMPLE | 14 | | | | | | 850 |
| COMPARATIVE EXAMPLE | 15 | S25C CO. 25 wt % | | | | | — |
| EXAMPLE | 16 | | | | | | 850 |
| COMPARATIVE EXAMPLE | 17 | S35C CO. 35 wt % | | | | | — |

TABLE 3-continued

| EXAMPLE | 18 | | | | | | 850 |
|---|---|---|---|---|---|---|---|

| | WELDING CONDITIONS | | | SHAPE OF MELTED AND SOLIDIFIED PORTION | | | |
|---|---|---|---|---|---|---|---|
| | REMELTING CONDITIONS | | | MELTED AND PORTION (mm) | | REMELTED AND SOLIDIFIED PORTION (mm) | |
| | WELDING SPEED (mm/s) | SOLIDIFIED POINT DIAMETER (mm) | SHIELDING GAS | WIDTH W0 | DEPTH d0 | WIDTH W1 | DEPTH d1 |
| COMPARATIVE EXAMPLE | — | — | NITROGEN | | | — | — |
| EXAMPLE | 50 | 1.5 | | | | 1.05 | 0.23 |
| COMPARATIVE EXAMPLE | — | — | | | | — | — |
| EXAMPLE | 50 | 1.5 | | | | 1.05 | 0.23 |
| COMPARATIVE EXAMPLE | — | — | | | | — | — |
| EXAMPLE | 50 | 1.5 | | | | 1.05 | 0.23 |
| COMPARATIVE EXAMPLE | — | — | | | | — | — |
| EXAMPLE | 50 | 1.5 | | | | 1.05 | 0.23 |
| COMPARATIVE EXAMPLE | — | — | | | | — | — |
| EXAMPLE | 50 | 1.5 | | | | 1.05 | 0.23 |

TABLE 4

| | TEST CONDI-TIONS | RESIDUAL STRESS (MPa) | | | AVERAGE HARDNESS (Hv) | | RECESS DEPTH OF SOLIDIFICATION TERMINAL PORTION (mm) | FATIGUE STRENGTH (MPa) | EVALU-ATION | BASE MATERIAL STRENGTH (MPa) |
|---|---|---|---|---|---|---|---|---|---|---|
| | | A1 | A2 | A3 | POSITION ① | POSITION ② | | | | |
| COMPARATIVE EXAMPLE | 9 | −179 | 139 | 107 | 379 | — | 0.1 | 240 | ○ | 200 |
| EXAMPLE | 10 | −209 | 110 | 95 | 393 | 353 | 0.05 | 260 | ○ | |
| COMPARATIVE EXAMPLE | 11 | −44 | 237 | 159 | 460 | — | 0.1 | 170 | x | 230 |
| EXAMPLE | 12 | −363 | 211 | 140 | 455 | 360 | 0.05 | 260 | ○ | |
| COMPARATIVE EXAMPLE | 13 | −20 | 213 | 139 | 463 | — | 0.1 | 180 | x | 260 |
| EXAMPLE | 14 | −322 | 225 | 130 | 435 | 365 | 0.05 | 330 | ○ | |
| COMPARATIVE EXAMPLE | 15 | −44 | 258 | 151 | 543 | — | 0.1 | 290 | ○ | 270 |
| EXAMPLE | 16 | −328 | 274 | 149 | 560 | 415 | 0.05 | 310 | ○ | |
| COMPARATIVE EXAMPLE | 17 | −189 | 213 | 95 | 671 | — | 0.1 | 370 | ○ | 330 |
| EXAMPLE | 18 | −165 | 277 | 134 | 660 | 453 | 0.05 | 400 | ○ | |

The residual stress of the surface 3a of the welded portion 3 was measured by using a measurement method similar to that for the first examples. In this instance, under Conditions 9, Conditions 11, Conditions 13, Conditions 15, and Conditions 17, which are for the comparative examples, the residual stress at the center point in the width direction of the melted and solidified portion 3d was measured at the measurement point A1, and the residual stress at points where the structure had not been changed by the welding was measured at the measurement point A2 and the measurement point A3. Furthermore, under Conditions 10, Conditions 12, Conditions 14, Conditions 16, and Conditions 18, which are for the examples, the residual stress at the center point in the width direction of the remelted and solidified portion 5 was measured at the measurement point A1, and the residual stress at points where the structure had not been changed by the welding was measured at the measurement point A2 and the measurement point A3.

The results demonstrated that under all of Conditions 9 to 18, the residual stresses at the measurement point A1 were negative values, that is, a compressive stress was present at and near the measurement point A1. Furthermore, the residual stresses at the measurement point A1 of the specimens 12 under Conditions 10, Conditions 12, Conditions 14, and Conditions 16, that is, the residual stresses at the measurement point A1 of the specimens 12 resulting from the heat conduction welding, which was performed after the keyhole welding, were negative values smaller than the residual stresses at the measurement point A1 of the specimens 12 under Conditions 9, Conditions 11, Conditions 13, and Conditions 15, respectively, that is, the residual stresses at the measurement point A1 of the specimens 12 resulting from the keyhole welding exclusively performed. Accordingly, under Conditions 10, Conditions 12, Conditions 14, and Conditions 16, in which heat conduction welding was performed after keyhole welding, the formation of cracks at and near the measurement point A1 can be inhibited to a further degree than under Conditions 9, Conditions 11, Conditions 13, and Conditions 15, in which keyhole welding was exclusively performed.

Note that in the cases of Conditions 17 and Conditions 18, that is, in the case where the specimen 12 was formed of S35C, the residual stress at the measurement point A1 in the example (Conditions 18), in which heat conduction welding was performed after keyhole welding, was a negative value slightly greater than the residual stress at the measurement point A1 in the comparative example (Conditions 17), in which keyhole welding was exclusively performed. However, considering the fact that the value was a negative value smaller than those of Conditions 13, Conditions 15, and Conditions 17, which are other comparative examples, inhibition of the formation of cracks at and near the measurement point A1 can also be expected for the example of Conditions 18, in which S35C was used, as with the other examples in which S10C to S25C were used.

Regarding the hardness of the joint 1 under Conditions 9 to Conditions 18, the Vickers hardness of the base material that included the reheated solidified portion 4 and the remelted and solidified portion 5 of the specimen 12 was measured and evaluated in a manner similar to that for Conditions 1 to Conditions 8 of the first examples. As shown in FIG. 21, FIG. 23, FIG. 25, FIG. 27, and FIG. 29, the results were that under Conditions 10, Conditions 12, Conditions 14, Conditions 16, and Conditions 18, an average Vickers hardness value of the reheated solidified portion 4 was lower than an average Vickers hardness value of the remelted and solidified portion 5. Furthermore, as shown in FIG. 20, FIG. 22, FIG. 24, FIG. 26, and FIG. 28, under Conditions 9, Conditions 11, Conditions 13, Conditions 15, and Conditions 17, the Vickers hardness of the melted and solidified portion 3d was a numerical value higher than that of other portions of the joint that had not been melted by the keyhole welding.

Figure 27:
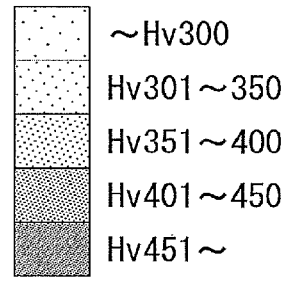
FIG. 27 is a diagram showing a hardness distribution of a sample welded by keyhole welding and heat conduction welding in S25C of a second example.
Figure 28:
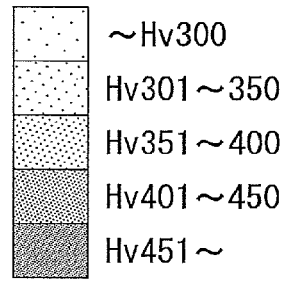
FIG. 28 is a diagram showing a hardness distribution of a sample welded exclusively by keyhole welding in S35C of a second example.
Figure 29:
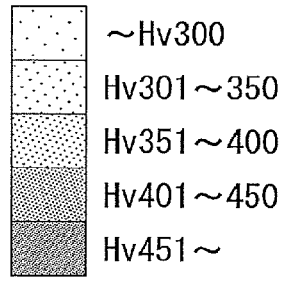
FIG. 29 is a diagram showing a hardness distribution of a sample welded by keyhole welding and heat conduction welding in S35C of a second example.

As shown in FIG. 27, under Conditions 16, at the site of (0.3 mm, 0.4 mm), which corresponds to (vertical, lateral), the hardness was 726 Hv, and at the site of (0.3 mm, 0.5 mm), the hardness was 655 Hv; the numerical values were very high compared with those of the other sites. Presumably, a reason that the Vickers hardness was high at the above-mentioned two sites is similar to a reason that a site having a high hardness was formed under Conditions 1. That is, presumably, this is because these two sites were located at or near the boundary between the melted portion associated with the keyhole welding and the heat affected zone, which was hardened under the influence of the heating for the keyhole welding, and, consequently, the structure at and near the boundary was martensitized.

Furthermore, the recess depth h of the solidification terminal portion 6 of the welded portion 3 was 0.1 mm under Conditions 9, Conditions 11, Conditions 13, Conditions 15, and Conditions 17, in which keyhole welding was exclusively performed, whereas the recess depth h was 0.01 mm to 0.06 mm under Conditions 10, Conditions 12, Conditions 14, Conditions 16, and Conditions 18, in which heat conduction welding was performed after keyhole welding. Furthermore, the numerical values of the recess depth h of the solidification terminal portion 6 of the remelted and solidified portion 5 and the depth d1 of the remelted and solidified portion 5 were 0.05 mm for h and 0.23 mm for d1 under all of Conditions 10, Conditions 12, Conditions 14, Conditions 16, and Conditions 18. Accordingly, the recess depth h of the solidification terminal portion 6 of the remelted and solidified portion 5 and the depth d1 of the remelted and solidified portion 5 had the relationship of formula (3) mentioned above. Hence, regarding the second examples, too, by performing heat conduction welding after keyhole welding, the recess depth h of the solidification terminal portion 6 can be reduced, and as a result, concentration of the stress that acts on the solidification terminal portion 6 can be inhibited.

Regarding the rotating bending fatigue strength, specimens 12 formed of the respective materials, S10C to S35C, were prepared, and, in a manner similar to that for the first examples, the specimens 12 were mounted to the ONO-type rotating-bending fatigue tester, and the load at which breakage occurred (i.e., a maximum value of the cyclic stresses that acted on a center portion (welded portion 3) in the axial direction of the specimen 12) in a case where rotation was performed 20 million times at a rotational speed of 2000 rpm was measured. Furthermore, to evaluate the measured rotating bending fatigue strength of the specimens 12, the rotating bending fatigue test was similarly conducted on each of specimens 13 for comparison, which had the same shape and size as the specimens 12 and were seamlessly integrally formed of the respective materials, S10C to S35C, and thus, the rotating bending fatigue strength of the base material itself (base material strength) was measured.

The results were that in all of the specimens 12 of Conditions 10, Conditions 12, Conditions 14, Conditions 16, and Conditions 18, the width W0 of the melted and solidified portion 3d, the depth d0 of the melted and solidified portion 3d, the width W1 of the remelted and solidified portion 5, and the depth d1 of the remelted and solidified portion 5 satisfied the relationships of formula (1) and formula (2) mentioned above, and thus, rotating bending fatigue strengths that were higher than those of the integrally formed samples 13 (i.e., the base material itself) were achieved. Presumably, this is because, as with the specimens 8 of the first examples, in the specimens 12 of the second examples, the reheated solidified portion 4, which was formed in an inner region relative to the remelted and solidified portion 5 in the welded portion 3, had a low hardness and, therefore, had a high toughness compared with the remelted and solidified portion 5, which was formed in a region closer to the surface 3a of the welded portion 3, and, consequently, even if cracks had been formed in the surface 3a of the welded portion 3, the cracks would not have easily propagated to an inner portion.

From the measurement results described above, it was determined that under Conditions 10, Conditions 12, Conditions 14, Conditions 16, and Conditions 18, which were for the second examples, the fatigue strength was improved for all of the steel materials having a carbon concentration (carbon content) in a range of 0.1 mass % to 0.35 mass %, because the rotating bending fatigue strengths of the specimens 12, which were prepared by butt-welding together the samples 10, 10, which served as the base materials 2, 2, were higher than the rotating bending fatigue strength of the specimen 13 for comparison (base material itself), which was integrally formed of a single base material. On the other hand, under Conditions 9, Conditions 15, and Conditions 17, which were for the second comparative examples, the rotating bending fatigue strengths of the specimens 12 were higher than the rotating bending fatigue strengths of specimen 13 for comparison, and, therefore, it can be determined that the fatigue strength was improved; however, in the cases of Conditions 11 and Conditions 13, the rotating bending fatigue strengths of the specimens 12 were lower than that of the specimen 13 for comparison, and, therefore, it cannot be said that the fatigue strength was improved.

Accordingly, regarding the specimens 12 obtained by exclusive keyhole welding, it cannot necessarily be said that the fatigue strength was improved for all of the steel materials having a carbon concentration (carbon content) in a range of 0.1 mass % to 0.35 mass %.

REFERENCE SIGNS LIST

1 Butt-welded joint
2 Base material
3 Welded portion
3d Melted and solidified portion
4 Reheated solidified portion
5 Remelted and solidified portion
6 Solidification terminal portion
8, 12 Specimen
10 Sample
11, 13 Specimen for comparison

The invention claimed is:

1. A butt-welded joint of steel materials, base materials of the butt-welded joint being a pair of the steel materials, in a state in which end portions of the pair of the base materials are abutted against each other, the butt-welded joint comprising a welded portion formed in a circumferential direction along the end portions to extend from surfaces of the base materials to an inner portion of the base materials and straddle the end portions, wherein
the base materials have a carbon concentration of 0.1 mass % or greater and 0.35 mass % or less,
the welded portion includes a melted and solidified portion, a remelted and solidified portion, and a reheated solidified portion, the melted and solidified portion being a portion resulting from melting and solidification of the end portions of a pair of base materials made of the steel materials, the melting being caused as a result of first heating from the surfaces, the remelted and solidified portion being a portion resulting from remelting and resolidification of the melted and solidified portion, the remelting being caused as a result of reheating of the melted and solidified portion from a surface thereof, the reheated solidified portion being a portion formed in an inner region relative to the remelted and solidified portion and having a structure resulting from a change in a structure of the melted and solidified portion, the change being due to the reheating, the change involving no melting, and
a width W0 of the melted and solidified portion, a depth d0 from a surface of the welded portion to a deepest portion of the melted and solidified portion, a width W1 of the remelted and solidified portion, and a depth d1 from the surface of the welded portion to a deepest portion of the remelted and solidified portion have the following relationships:

$0.46W0 \leq W1$, and $0.14d0 \leq d \leq 0.73d0$, and in the welded portion formed in the circumferential direction along the end portions of the abutted base materials, a starting portion of the welded portion and a terminal portion thereof are formed to overlap each other at the same location in the circumferential direction, and at the location where the starting portion and the terminal portion overlap each other, a depth h, from the surface of the welded portion, of a recess formed in the remelted and solidified portion and a depth d1 of the remelted and solidified portion have the following relationship:

$0.32d1 > h$.

2. The butt-welded joint of steel materials according to claim 1, wherein an average Vickers hardness value of the reheated solidified portion is lower than an average Vickers hardness value of the remelted and solidified portion.

3. The butt-welded joint of steel materials according to claim 1, wherein a residual stress of a surface of the remelted and solidified portion is a compressive stress in a center region in a width direction of the remelted and solidified portion.

4. The butt-welded joint of steel materials according to claim 1, wherein the melted and solidified portion is formed as a result of keyhole welding, and the remelted and solidified portion and the reheated solidified portion are formed as a result of heat conduction welding.

5. The butt-welded joint of steel materials according to claim 1, wherein the base materials have a cylindrical shape.

6. A method for manufacturing a butt-welded joint of steel materials, the method comprising abutting end portions of a pair of base materials made of the steel materials against each other and forming a welded portion in a manner such that the welded portion in a circumferential direction along the end portions extends from surfaces of the base materials to an inner portion of the base materials and straddles the end portions, wherein
the base materials have a carbon concentration of 0.1 mass % or greater and 0.35 mass % or less,
the welded portion is formed by a first step and a second step, the first step including forming a melted and solidified portion by melting and solidifying the end portions of the pair of base materials, the melting being caused by first heating from the surfaces, the second step including forming a remelted and solidified portion and a reheated solidified portion by reheating the melted and solidified portion from a surface thereof, the remelted and solidified portion being formed by remelting and resolidification of the melted and solidified portion, the reheated solidified portion being formed in an inner region relative to the remelted and solidified portion, with a structure of the reheated solidified portion resulting from a change in a structure of the melted and solidified portion, the change involving no melting, and
a width W0 of the melted and solidified portion, a depth d0 from a surface of the welded portion to a deepest portion of the melted and solidified portion, a width W1 of the remelted and solidified portion, and a depth d1 from the surface of the welded portion to a deepest portion of the remelted and solidified portion have the following relationships:

$0.46W0 \leq W1$, and $0.14d0 \leq d1 \leq 0.73d0$, and in the welded portion formed in the circumferential direction along the end portions, a starting portion of the welded portion and a terminal portion thereof are formed to overlap each other at the same location in the circumferential direction, and at the location where the starting portion and the terminal portion overlap each other, a depth h, from the surface of the welded portion, of a recess formed in the remelted and solidified portion and a depth d1 of the remelted and solidified portion have the following relationship:

$$0.32 d1 > h.$$

7. The method for manufacturing a butt-welded joint according to claim 6, wherein, in the first step, the melted and solidified portion is formed by keyhole welding, and in the second step, the remelted and solidified portion and reheated solidified portion are formed by heat conduction welding.

8. Method for manufacturing a butt-welded joint according to claim 6, wherein the base materials have a cylindrical shape.

* * * * *